US012800300B2

(12) United States Patent
Ito et al.

(10) Patent No.: US 12,800,300 B2
(45) Date of Patent: Nov. 17, 2026

(54) ESTIMATION DEVICE, ESTIMATION METHOD, AND NON-TRANSITORY COMPUTER-READABLE RECORDING MEDIUM FOR THICKNESS OF DEPOSIT

(71) Applicants: YOKOGAWA ELECTRIC CORPORATION, Tokyo (JP); Tokyo University of Marine Science and Technology, Tokyo (JP)

(72) Inventors: Shumpei Ito, Tokyo (JP); Yoshiaki Tanaka, Tokyo (JP); Tatsuya Hazuku, Tokyo (JP); Motoaki Morita, Tokyo (JP); Tomonori Ihara, Tokyo (JP)

(73) Assignees: YOKOGAWA ELECTRIC CORPORATION, Tokyo (JP); TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 559 days.

(21) Appl. No.: 17/960,369

(22) Filed: Oct. 5, 2022

(65) Prior Publication Data

US 2023/0105228 A1 Apr. 6, 2023

(30) Foreign Application Priority Data

Oct. 6, 2021 (JP) ................................ 2021-164870
Sep. 26, 2022 (JP) ................................ 2022-152654

(51) Int. Cl.
*G01B 21/08* (2006.01)
*G01N 25/18* (2006.01)

(52) U.S. Cl.
CPC .......... *G01B 21/085* (2013.01); *G01N 25/18* (2013.01)

(58) Field of Classification Search
CPC ....... G01B 21/085; G01B 21/02; G01N 25/18
See application file for complete search history.

(56) References Cited

U.S. PATENT DOCUMENTS 8,960,305 B2 * 2/2015 McCann .............. E21B 19/002 166/344
2004/0059505 A1 * 3/2004 Gallagher ................ F17D 3/01 702/1

(Continued)

FOREIGN PATENT DOCUMENTS

CN 107402407 A * 11/2017 ............ G01V 3/088
JP H063300 A 1/1994

(Continued)

OTHER PUBLICATIONS

Extended European Search Report issued in corresponding European Patent Application No. EP 22199895.8 dated Mar. 7, 2023 (5 pages).

(Continued)

*Primary Examiner* — Lal Ce Mang
(74) *Attorney, Agent, or Firm* — Osha Bergman Watanabe & Burton LLP

(57) ABSTRACT

An estimation device includes a controller that: obtains first-type temperature data for a position corresponding to an outside of a first-type position of a pipe in which a fluid flows; obtains second-type temperature data for a position corresponding to an outside of a second-type position of the pipe at which condition related to heat transfer is different than condition at the first-type position; based on the first-type temperature data and the second-type temperature data, calculates thermal resistance of a deposit formed on an inner surface of the pipe, and estimates a thickness of the deposit.

12 Claims, 12 Drawing Sheets

(56) References Cited

U.S. PATENT DOCUMENTS

| | | | | |
|---|---|---|---|---|
| 2011/0308548 | A1 | 12/2011 | Amundsen et al. | |
| 2019/0219473 | A1* | 7/2019 | Littlestar | E21B 17/01 |
| 2019/0243996 | A1* | 8/2019 | Kobayashi | G05B 23/0272 |
| 2020/0348131 | A1* | 11/2020 | Taniguchi | G01N 17/008 |
| 2021/0108917 | A1* | 4/2021 | Hazuku | G01B 21/085 |
| 2021/0301625 | A1 | 9/2021 | Ito et al. | |

FOREIGN PATENT DOCUMENTS

| | | | | |
|---|---|---|---|---|
| JP | 6422461 | B2 * | 11/2018 | F16L 59/14 |
| JP | 2019133596 | A | 8/2019 | |
| WO | WO-2011018592 | A1 * | 2/2011 | G01N 17/008 |

OTHER PUBLICATIONS

Office Action issued in corresponding Japanese Patent Application No. 2022-152654, dated Jul. 1, 2025, with translation (6 pages).
Office Action issued in corresponding Chinese Patent Application No. 202211210083.8, dated Mar. 1, 2026, with translation (29 pages).

* cited by examiner

ESTIMATION DEVICE, ESTIMATION METHOD, AND NON-TRANSITORY COMPUTER-READABLE RECORDING MEDIUM FOR THICKNESS OF DEPOSIT

CROSS-REFERENCE TO RELATED APPLICATIONS

The present application claims priority from Japanese Patent Application No. 2021-164870 filed in Japan on Oct. 6, 2021 and Japanese Patent Application No. 2022-152654 filed in Japan on Sep. 26, 2022, the contents of which are incorporated herein by reference in their entirety.

BACKGROUND

Technical Field

The present invention relates to an estimation device, an estimation method, and a non-transitory computer-readable recording medium for a thickness of a deposit.

Description of the Related Art

Typically, in an oil pipeline or a gas pipeline, due to the conditions such as temperature and pressure, a deposit such as hydrate, wax, asphaltene, or scale gets formed. That issue is handled by removing the deposit according to a method of inserting a pharmacological agent called an inhibitor that suppresses the generation of the deposit, or according to a method of passing a tool called a pig into the pipeline. However, in the present situation, since there are no means to measure the thickness of the formed deposit (hereinafter, referred to as "deposit thickness"), it has not been possible to optimally implement the measures such as using an inhibitor or a pig. Hence, there has been a demand for a technology that enables estimation of the deposit thickness inside a pipe.

As that kind of technologies, Japanese Patent Application Laid-open No. 2019-133596, U.S. Unexamined Patent Application Publication No. 2004/0059505, U.S. Pat. No. 8,960,305 mentioned below can be cited.

However, in the technologies mentioned above, it is difficult to accurately estimate the deposit thickness inside a pipe. That is because of the following issues faced in the technologies mentioned above. Japanese Patent Application Laid-open No. 2019-133596 represents the technology for estimating the shape of the deposit using a plurality of temperature sensors installed on the circular pipe surface. However, in that technology, unless the temperature of the fluid inside and outside of the pipe can be accurately estimated or measured, it is not possible to accurately estimate the deposit shape. For example, if the estimated value of the fluid temperature inside and outside of the pipe is not correct; then, according to that technology, the shape of the deposit is estimated to have a greater thickness or a smaller thickness than the actual shape.

Moreover, in Japanese Patent Application Laid-open No. 2019-133596, if the fluid temperature is provided on experiential grounds or based on the analysis of a flow simulator, then that temperature is likely to be significantly different than the actual temperature. In the case of estimating such a value based on the past estimation results, due to the fact that the temperature inside and outside of the pipe changes with time, the difference between the estimated value and the actual value goes on increasing with time.

U.S. Unexamined Patent Application Publication No. 2004/0059505 represents a deposit monitoring technology in which the deposit is monitored by measuring the pipe surface temperature of an oil pipeline or a gas pipeline using an array temperature sensor. However, in that technology, unless the temperature of the fluid inside and outside of the pipe can be accurately estimated or measured, it is not possible to estimate the deposit shape with accuracy.

Furthermore, U.S. Pat. No. 8,960,305 represents a technology in which the temperature, the vibrations, the pressure, and the strain distribution in the pipe axis direction of a pipeline is measured using a distributed temperature sensor (DTS), and a model of the pipeline such as a flow assurance simulator is corrected to monitor the state of the entire pipeline. In that technology, since the fluid temperature inside the pipe cannot be accurately estimated, the deposit thickness cannot be estimated with accuracy. Hence, there has been a demand for an estimation device that enables accurate estimation of the deposit thickness inside a pipe.

SUMMARY

One or more embodiments provide an improvement over conventional technologies by allowing accurate estimations to be made of deposit thickness inside a pipe. According to one or more embodiments, An estimation device includes, a first obtaining unit (a controller) that obtains first-type temperature data for a position corresponding to outside of a first-type position of a pipe in which a fluid flows, a second obtaining unit (the controller) that obtains second-type temperature data for a position corresponding to outside of a second-type position of the pipe at which condition related to heat transfer is different than condition at the first-type position; and an estimating unit (the controller) that based on the first-type temperature data and the second-type temperature data, calculates thermal resistance of a deposit formed on inner surface of the pipe, and estimates thickness of the deposit.

According to one or more embodiments, an estimation method includes, obtaining first-type temperature data for a position corresponding to outside of a first-type position of a pipe in which a fluid flows, obtaining second-type temperature data for a position corresponding to outside of a second-type position of the pipe at which condition related to heat transfer is different than condition at the first-type position, and estimating that includes calculating, based on the first-type temperature data and the second-type temperature data, thermal resistance of a deposit formed on inner surface of the pipe, and estimating thickness of the deposit.

According to an one or more embodiments, a non-transitory computer-readable recording medium stores therein estimation instructions that cause a computer to execute a process including, obtaining first-type temperature data for a position corresponding to outside of a first-type position of a pipe in which a fluid flows, obtaining second-type temperature data for a position corresponding to outside of a second-type position of the pipe at which condition related to heat transfer is different than condition at the first-type position, and estimating that includes calculating, based on the first-type temperature data and the second-type temperature data, thermal resistance of a deposit formed on inner surface of the pipe, and estimating thickness of the deposit.

DETAILED DESCRIPTION

Embodiments of an estimation device, an estimation method, and a non-transitory computer-readable recording medium according to the present invention is described below in detail with reference to the accompanying drawings. However, the present invention is not limited by the embodiments described below.

The following explanation is given in the order of a configuration of an estimation system 100 according to one or more embodiments, a configuration of an estimation device 10, the flow of various operations, and specific examples of a pipe and a temperature sensor. That is followed by the explanation about the effects of one or more embodiments

Configuration of Estimation System 100

Figure 1:
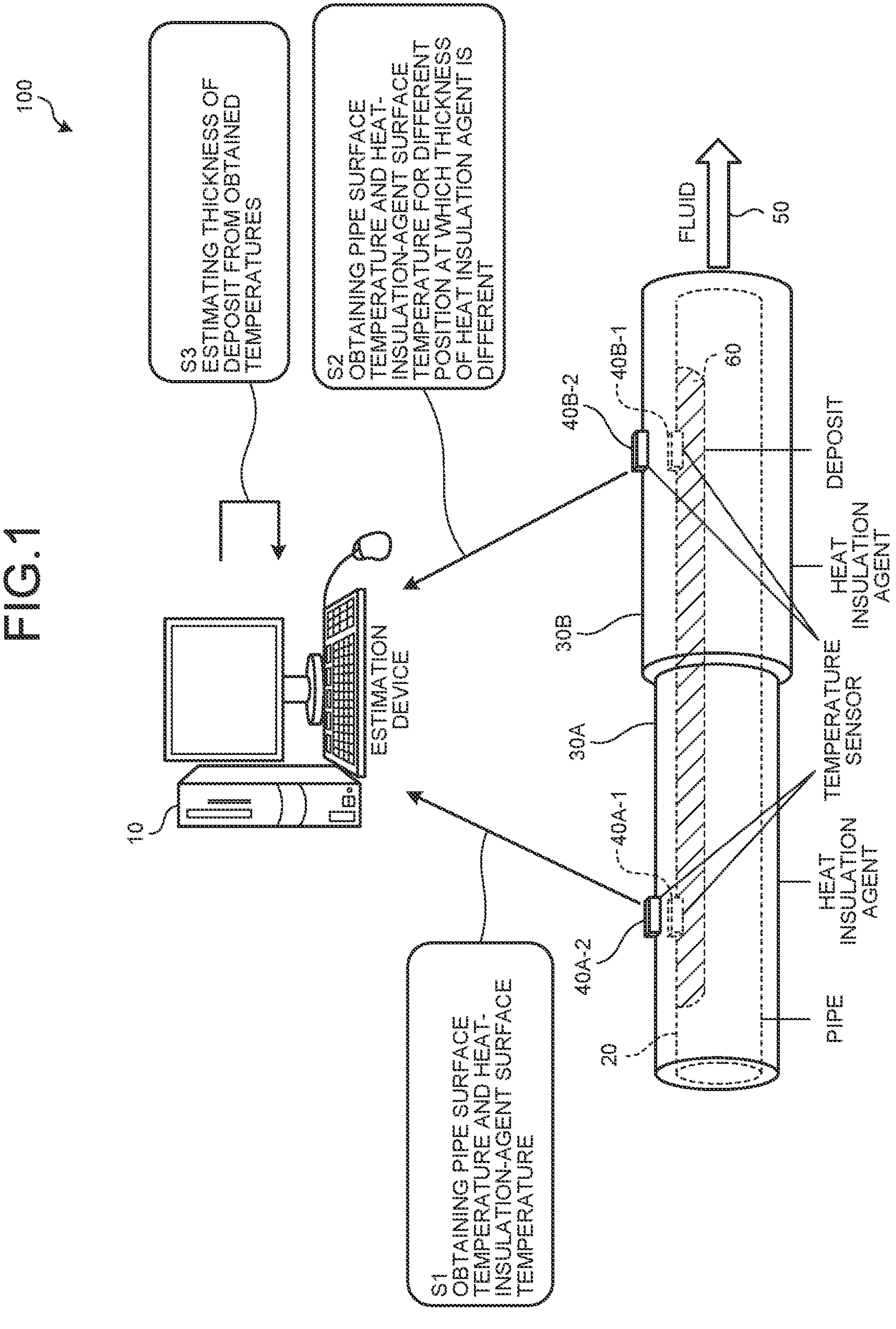
FIG. 1 is a diagram illustrating an exemplary configuration of an estimation system according to one or more embodiments.

Explained below in detail with reference to FIG. 1 is a configuration of the estimation system 100 according to one or more embodiments (hereinafter, also referred to as the estimation system). FIG. 1 is a diagram illustrating an exemplary configuration of the estimation system according to one or more embodiments. In the following explanation, an example of the overall configuration of the estimation system 100 is explained, and that is followed by the explanation about the operations performed in the estimation system 100. In one or more embodiments, although the explanation is given with reference to an oil pipeline or a gas pipeline, that is not the only possible target. That is, one or more embodiments can be implemented in pipelines through which a variety of fluids flow, such as a pipeline for guiding the cooling water to a power plant or a pipeline for guiding hot spring water to a predetermined location.

Exemplary Configuration of Entire System

The estimation system 100 includes the estimation device 10 and temperature sensors 40 (40A-1, 40A-2, 40B-1, and 40B-2). The estimation device 10 and the temperature sensor 40 are communicably connected to each other in a wired manner or a wireless manner via a predetermined communication network (not illustrated). Meanwhile, the estimation system 100 illustrated in FIG. 1 can include a plurality of estimation devices 10.

The temperature sensor 40A-1 is installed on the outer surface of a pipe 20 of an oil pipeline or a gas pipeline. The temperature sensor 40A-2 is installed on the outer surface of a heat insulation agent 30A that covers the pipe 20. The temperature sensor 40B-1 is installed on the outer surface of the pipe 20 of an oil pipeline or a gas pipeline. The temperature sensor 40B-2 is installed on the outer surface of a heat insulation agent 30B that covers the pipe 20 and that has a different thickness than the thickness of the heat insulation agent 30A. Meanwhile, a fluid 50 such as oil or a gas flows through the pipe 20. Moreover, a deposit 60 such as hydrate, wax, asphaltene, or scale gets formed on the inner surface of the pipe 20.

Operations Performed in Entire System

Regarding the system explained above, the following explanation is given about estimating the deposit thickness inside the pipe. Firstly, on the outside of a position of the pipe 20 at which the deposit 60 is formed on the inner surface (hereinafter, called a "first deposit formation position"), the estimation device 10 obtains the pipe surface temperature from the temperature sensor 40A-1 and obtains the heat-insulation-agent surface temperature from the temperature sensor 40A-2 (Step S1). Moreover, on the outside of a position of the pipe 20 at which the deposit 60 is formed on the inner surface and which is different than the first deposit formation position (hereinafter, called a "second deposit formation position"), the estimation device 10 obtains the pipe surface temperature from the temperature sensor 40B-1 and obtains the heat-insulation-agent surface temperature from the temperature sensor 40B-2 (Step S2).

Figure 2:
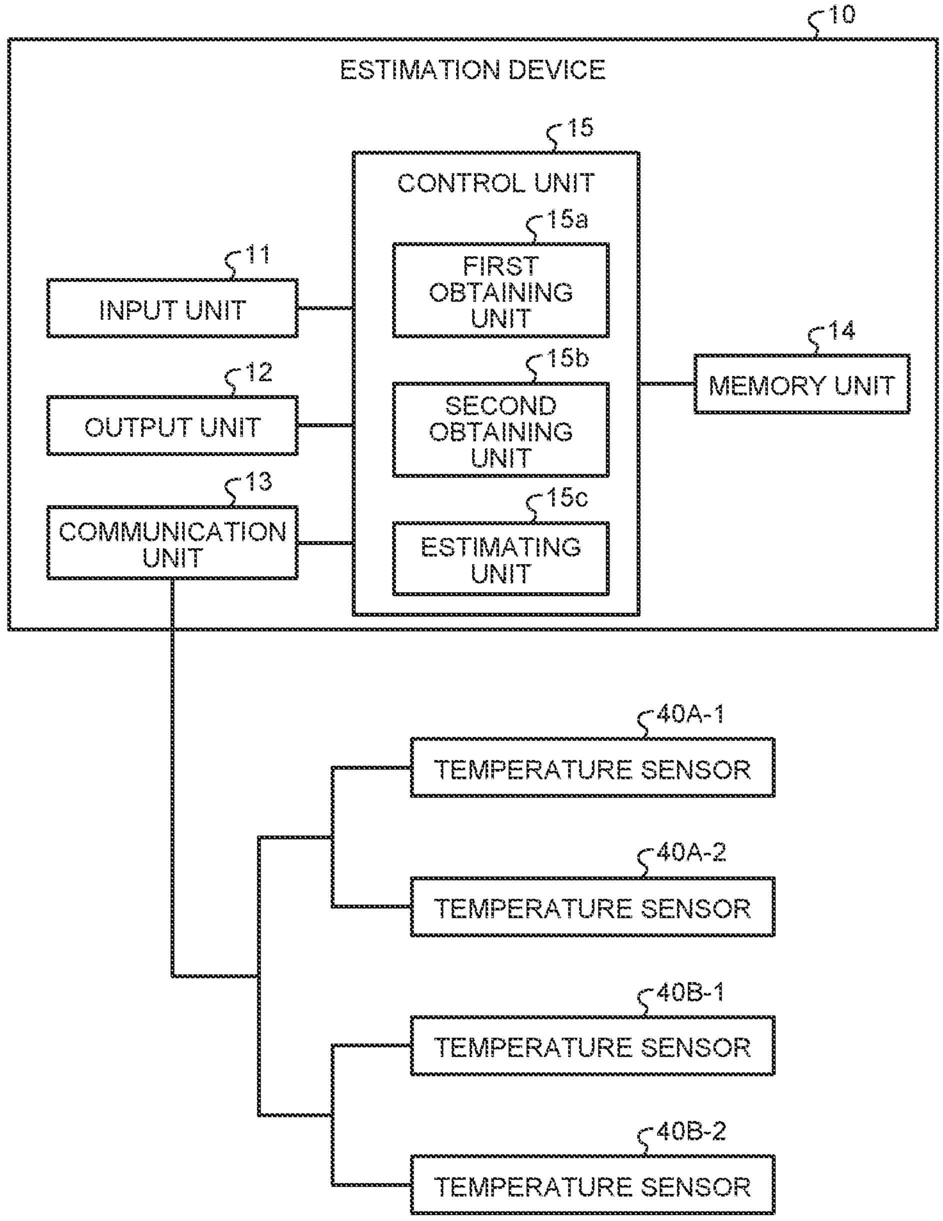
FIG. 2 is a block diagram illustrating an exemplary configuration of the estimation system according to one or more embodiments.

The temperature sensors 40 (40A and 40B) are, for example, thermocouple sensors, or resistance temperature detectors, or DTSs, or thermography cameras. The temperature sensors 40A measure the pipe surface temperature and the heat-insulation-agent surface temperature at the first deposit formation position. The temperature sensors 40B measure the pipe surface temperature and the heat-insulation-agent surface temperature at the second deposit formation position. With reference to FIG. 2, two temperature sensors 40A and two temperature sensors 40B are installed. However, there can be three or more temperature sensors 40A and three or more temperature sensors 40B installed across the entire pipe or the entire heat insulation agent.

Subsequently, using the temperature data obtained from the temperature sensors 40A and 40B, the estimation device 10 calculates the thermal resistance of the deposit 60 and then estimates the deposit thickness (Step S3). Regarding the details of the estimation operation for estimating the deposit thickness, the explanation is given later in [Flow of operations] (4. Flow of deposit thickness estimation operation). Moreover, using the temperature data obtained from the temperature sensors 40A and 40B, the estimation device 10 can also estimate the in-pipe fluid temperature. Regarding the details of the estimation operation for estimating the in-pipe fluid temperature, the explanation is given later in [Flow of operations] (5. Flow of in-pipe fluid temperature estimation operation).

As a result of performing the operations from Step S1 to Step S3 explained above, the thickness of the deposit formed inside the pipeline can be estimated in an inexpensive, non-invasive, and accurate manner without having to measure the fluid temperature inside the oil pipeline or the gas pipeline.

Configuration of Estimation Device 10 and Other Devices

Explained below with reference to FIG. 2 is a functional configuration of the devices included in the estimation system 100 illustrated in FIG. 1. FIG. 2 is a block diagram illustrating an exemplary configuration of the estimation system according to one or more embodiments. The following explanation is given in the order of a configuration of the estimation device 10, a configuration of the temperature sensors 40, and a configuration of the other devices according to one or more embodiments.

1. Configuration of Estimation Device 10

The estimation device 10 includes an input unit 11, an output unit 12, a communication unit 13, a memory unit 14, and a control unit 15. The input unit 11 controls the input of a variety of information to the estimation device 10. For example, the input unit 11 is implemented using a mouse or a keyboard, and receives input of the setting information with respect to the estimation device 10. The output unit 12 controls the output of a variety of information from the estimation device 10. For example, the output unit 12 is implemented using a display, and outputs the setting information stored in the estimation device 10.

The communication unit 13 controls the data communication with other devices. For example, the communication unit 13 communicates data with other devices via a network device (not illustrated). Moreover, the communication unit 13 can communicate data with the operator terminal (not illustrated).

The memory unit 14 is used to store a variety of information referred to by the control unit 15 while performing operations, and to store a variety of information obtained by the control unit 15 while performing operations. The memory unit 14 can be implemented using, for example, a semiconductor memory device such as a random access memory (RAM) or a flash memory; or a storage device such as a hard disk or an optical disc. Meanwhile, in the example illustrated in FIG. 2, the memory unit 14 is installed in the estimation device 10. However, alternatively, the memory unit 14 can be installed on the outside of the estimation device 10. Moreover, a plurality of memory units can also be installed.

Herein, the memory unit 14 is used to store the information to be used in an estimation operation performed by an estimating unit 15_c_. For example, the memory unit 14 is used to store the following measured values and estimated values: thermal conductivity $k_p$ of the pipe; thermal conductivity $k_i$ ($k_{i1}$, $k_{i2}$) of the heat insulation agents; thermal conductivity $k_{deposit}$ of the deposit; outer radius $r_{po}$ of the pipe (i.e., the inner radius of the heat insulation agents); inner radius $r_{pi}$ of the pipe; and outer radius $r_i$ ($r_{i1}$, $r_{i2}$) of the heat insulation agents. Moreover, the memory unit 14 is used to store the following information: the thickness, the material, the shape, and the layer count of the heat insulation agents; the arrangement of the temperature sensors 40; the pipe-related information such as the structure of the pipe; a heat transfer coefficient $h_{outer1}$ of the pipe; a heat transfer coefficient $h_{outer2}$ of the heat insulation agents; the fluid velocity of the fluid inside the pipe; the surrounding temperature; and the present or absence of wind.

The control unit 15 controls the estimation device 10 in entirety. The control unit 15 includes a first obtaining unit 15_a_, a second obtaining unit 15_b_, and the estimating unit 15_c_. The control unit 15 can be implemented, for example, using an electronic circuit such as a central processing unit (CPU) or a micro processing unit (MPU); or using an integrated circuit such as an application specific integrated circuit (ASIC) or a field programmable gate array (FPGA).

First Obtaining Unit 15_a_

The first obtaining unit 15_a_ obtains first-type temperature data for the position corresponding to the outside of a first-type position of the pipe 20 through which the fluid 50 flows. The first-type temperature data represents one or more sets of temperature data for the position corresponding to the outside of an arbitrary position of the pipe 20 through which the fluid 50 flows; and indicates the pipe surface temperature, the heat-insulation-agent surface temperature, the temperature of the inside of the heat insulation agents, the air temperature, and the fluid temperature on the outside of the pipe.

Regarding the first-type position, for example, as the first-type temperature data, the first obtaining unit 15_a_ obtains the temperature data for the position corresponding to the outside of the first-type position of the pipe 20 at which the deposit 60 is formed on the inner surface of the pipe 20. Moreover, as the first-type temperature data, the first obtaining unit 15_a_ obtains one or more sets of temperature data for the position corresponding to the outside of the first-type position of the pipe 20 at which the pipe 20 is covered by a cladding. Furthermore, as the first-type temperature data, the first obtaining unit 15_a_ obtains one or more sets of temperature data for the position corresponding to the outside of the first-type position of the pipe 20 at which the pipe 20 is not covered by a cladding such as the heat insulation agents 30 (30A, 30A). Herein, the cladding represents a heat insulation agent, or a protective layer, or a cushioning material.

With reference to the example illustrated in FIG. 1, the first obtaining unit 15_a_ obtains the first-type temperature data in the pipe (pipeline) 20 that is meant for transmitting oil or a gas generated in a well. Meanwhile, the operations performed by the first obtaining unit 15_a_ are not limited to the explanation given above. Alternatively, for example, also in a pipe meant for transmitting cooling water to a power plant or in a pipe meant for transmitting hot spring water to a predetermined location, the first obtaining unit 15*a* can obtain the pipe surface temperature and the heat-insulation-agent surface temperature.

Regarding the obtained temperature data, for example, the first obtaining unit 15*a* obtains, as the first-type temperature, the temperature data of the pipe surface and the cladding surface on the outside of the first-type position of the pipe 20. At that time, the first obtaining unit 15*a* obtains first-type pipe surface temperature representing the temperature of the outer surface at the first-type position of the pipe 20, and obtains first-type cladding surface temperature representing the temperature of the cladding surface that is on the outside of the pipe 20 in a radial direction from the first-type position. Moreover, the first obtaining unit 15*a* obtains, as the first-type temperature data, two sets of temperature data of the inside of the cladding that is on the outside of the pipe 20 in a radial direction from the first-type position. That is, the first obtaining unit 15*a* obtains the temperature data of a temperature $T_1(T_5)$ representing the pipe surface temperature or the temperature of the inside of the heat insulation agent 30 near the pipe surface, and obtains the temperature data of a temperature $T_3$ representing the heat-insulation-agent surface temperature or the temperature of the inside of the heat insulation agent 30 near the heat insulation agent surface. Moreover, the first obtaining unit 15*a* obtains, as the first-type temperature data, the air temperature or the out-of-pipe fluid temperature on the outside of the first-type position of the pipe 20. That is, the first obtaining unit 15*a* obtains the temperature data of a temperature $T_6$ representing the air temperature or the out-of-pipe fluid temperature. Moreover, as far as obtaining information other than the temperature data is concerned, the first obtaining unit 15*a* obtains first-type heat flux data that is used in calculating a heat movement amount $Q_1$ from the fluid 50 toward the outside of the pipe 20 at the first-type position.

Second Obtaining Unit 15*b*

The second obtaining unit 15*b* obtains second-type temperature data for the position corresponding to the outside of a second-type position of the pipe 20 at which the conditions regarding heat transfer are different than the conditions at the first-type position. The conditions regarding heat transfer indicate the conditions related to the amount of heat movement, such as the thermal resistance or the thermal conductivity of the heat insulation agents and the heat transfer coefficient of the pipe surface. That is, the second obtaining unit 15*b* obtains, as the second-type temperature data, one or more sets of temperature data for the position corresponding to the outside of the second-type position of the pipe 20 at which the thermal resistance is different than the thermal resistance at the first-type position due to the difference in at least either the thickness, or the material, or the shape, or the layer count of the cladding.

Moreover, regarding the second-type position, the second obtaining unit 15*b* obtains, as the second-type temperature data, the temperature data for the position corresponding to the outside of the second-type position of the pipe 20 at which the deposit 60 is formed. At that time, the second obtaining unit 15*b* obtains, as the second-type temperature data, the temperature data for the position corresponding to the outside of the second-type position of the pipe 20 at which the deposit 60 is formed under the same conditions as the conditions at the first-type position. That is, the second obtaining unit 15*b* obtains, as the second-type temperature data, the temperature data for the position corresponding to the outside of the second-type position of the pipe 20 at which the deposit 60 is formed that has the same thickness and the same type as the deposit 60 formed at the first-type position. Furthermore, the second obtaining unit 15*b* obtains, as the second-type temperature data, one or more sets of temperature data for the position corresponding to the outside of the second-type position of the pipe 20 at which the pipe 20 is covered by a cladding such as the heat insulation agent 30. Alternatively, the second obtaining unit 15*b* can obtain, as the second-type temperature data, one or more sets of temperature data for the position corresponding to the outside of the second-type position of the pipe 20 at which the pipe 20 is not covered by a cladding such as the heat insulation agent 30.

With reference to the example illustrated in FIG. 1, the second obtaining unit 15*b* obtains the second-type temperature data in the pipe (pipeline) 20 meant for transmitting oil or a gas generated in a well. Meanwhile, the operations performed by the second obtaining unit 15*b* are not limited to the explanation given above. Alternatively, for example, also in a pipe meant for transmitting cooling water to a power plant or in a pipe meant for transmitting hot spring water to a predetermined location, the second obtaining unit 15*b* can obtain the pipe surface temperature and the heat-insulation-agent surface temperature.

Regarding the obtained temperature data, for example, as the second-type temperature data, the second obtaining unit 15*b* obtains the temperature data of the pipe surface and the cladding surface on the outside of the second-type position of the pipe 20. At that time, as the second-type temperature data, the second obtaining unit 15*b* obtains second-type pipe surface temperature representing the temperature of the outer surface at the second-type position of the pipe 20, and obtains second-type cladding surface temperature representing the temperature of the cladding surface that is on the outside of the pipe 20 in a radial direction from the second-type position. Moreover, the second obtaining unit 15*b* obtains two sets of second-type temperature data of the inside of the cladding that is on the outside of the pipe 20 in a radial direction from the second-type position. That is, the second obtaining unit 15*b* obtains the temperature data of a temperature $T_2$ representing the pipe surface temperature or the temperature of the inside of the heat insulation agent 30 near the pipe surface, and obtains the temperature data of a temperature $T_4$ representing the heat-insulation-agent surface temperature or the temperature of the inside of the heat insulation agent 30 near the heat insulation agent surface. Moreover, the second obtaining unit 15*b* obtains, as the second-type temperature data, the air temperature or the out-of-pipe fluid temperature on the outside of the second-type position of the pipe 20. That is, the second obtaining unit 15*b* obtains the temperature data of the temperature $T_6$ representing the air temperature or the out-of-pipe fluid temperature. Moreover, as far as obtaining information other than the temperature data is concerned, the second obtaining unit 15*b* obtains second-type heat flux data that is used in calculating a heat movement amount $Q_2$ from the fluid 50 toward the outside of the pipe 20 at the second-type position.

Estimating Unit 15*c*

The estimating unit 15*c* calculates, based on the first-type temperature data and the second-type temperature data, thermal resistance $R_{deposit}$ of the deposit 60 formed on the inner surface of the pipe 20, and then estimates thickness S of the deposit 60. For example, the estimating unit 15*c* calculates temperature difference data by referring to the first-type temperature data and the second-type temperature data; calculates the thermal resistance $R_{deposit}$ of the deposit 60 based on the temperature difference data; and then estimates the thickness S of the deposit 60. Moreover, the estimating unit 15c calculates the thermal resistance $R_{deposit}$ of the deposit 60 using the temperature difference data, the thermal resistance of the fluid 50, the thermal resistance of the pipe 20, and the thermal resistance of the cladding such as the heat insulation agent 30; and then estimates the thickness S of the deposit 60. At that time, the estimating unit 15c calculates the thermal resistance $R_{deposit}$ of the deposit 60 using the temperature difference between the first-type pipe surface temperature and the first-type cladding surface temperature, the temperature difference between the second-type pipe surface temperature and the second-type cladding surface temperature, the temperature difference between the first-type pipe surface temperature and the second-type pipe surface temperature, the thermal resistance of the fluid 50, the thermal resistance of the pipe 20, and the thermal resistance of the cladding; and then estimates the thickness δ of the deposit 60. Moreover, the estimating unit 15c calculates the thermal resistance of the deposit 60 using the temperature difference between the two sets of first-type temperature data, the temperature difference between the two sets of second-type temperature data, the temperature difference between the first-type temperature data and the second-type temperature data selected from among the two sets of first-type temperature data and two sets of second-type temperature data based on the obtained positions, the thermal resistance of the fluid 50, the thermal resistance of the pipe 20, and the thermal resistance of the cladding; and then estimates the thickness of the deposit 60.

That is, the estimating unit 15c calculates the numerical value of the thermal resistance $R_{deposit}$ of the deposit 60 using: the temperatures $T_1(T_5)$ and $T_3$ representing the first-type temperature data; the temperatures $T_2$ and $T_4$ representing the second-type temperature data; the numerical values of $T_1-T_3$, $T_2-T_4$, and $T_2-T_1$ representing the sets of temperature difference data; the numerical value of $R_{innht}$ representing the thermal resistance of the fluid 50; the numerical value of $R_{pipe}$ representing the thermal resistance of the pipe 20; and the numerical values of $R_1$ and $R_2$ representing the thermal resistances of the heat insulation agents 30A and 30B. Then, the estimating unit 15c refers to the thermal conductivity $k_{deposit}$ of the deposit 60 as stored in the memory unit 14, and calculates the estimated value of the thickness δ of the deposit 60.

The estimating unit 15c calculates the thermal resistance $R_{deposit}$ of the deposit 60 using the air temperature or the fluid temperature on the outside of the pipe 20, or using the heat transfer coefficient of the surface of the cladding such as the heat insulation agents 30; and then estimates the thickness δ of the deposit 60. That is, the estimating unit 15c calculates the numerical value of the thermal resistance $R_{deposit}$ of the deposit 60 using the numerical value of the temperature $T_6$ representing the air temperature or the out-of-pipe fluid temperature, and using the heat transfer coefficients $h_{outer1}$ and $h_{outer2}$ of the heat insulation agents 30A and 30B, respectively. Then, the estimating unit 15c refers to the thermal conductivity $k_{deposit}$ of the deposit 60 as stored in the memory unit 14, and calculates the estimated value of the thickness δ of the deposit 60.

The estimating unit 15c calculates the thermal resistance $R_{deposit}$ of the deposit 60 using the first-type temperature data, the second-type temperature data, the first-type heat flux data, and the second-type heat flux data; and then estimates the thickness δ of the deposit 60. That is, the estimating unit 15c calculates the numerical value of the thermal resistance $R_{deposit}$ of the deposit 60 using: the temperature $T_1(T_5)$ representing the first-type temperature data; the temperature $T_2$ representing the second-type temperature data; the numerical value of the heat movement amount $Q_1$ obtained from the first-type heat flux data; and the numerical value of the heat movement amount $Q_2$ obtained from the second-type heat flux data. Then, the estimating unit 15c refers to the thermal conductivity $k_{deposit}$ of the deposit 60 as stored in the memory unit 14, and calculates the estimated value of the thickness δ of the deposit 60.

With reference to the example illustrated in FIG. 1, the estimating unit 15c estimates the thickness of hydrate, wax, asphaltene, or scale based on the first-type temperature data and the second-type temperature data. That is, using the temperatures $T_1$ and $T_3$, which represent the first-type temperature data, and the temperatures $T_2$ and $T_4$, which represent the second-type temperature data, as obtained from the pipe (pipeline) 20 meant for transmitting oil or a gas generated in a well, the estimating unit 15c calculates the numerical value of the thermal resistance $R_{deposit}$ of hydrate, wax, asphaltene, or scale; refers to the thermal conductivity $k_{deposit}$ of each type of deposit stored in the memory unit 14; and calculates the estimated value of the thickness δ of the deposit formed in the pipeline.

Regarding the estimation of information other than the deposit thickness, the estimating unit 15c estimates the temperature of the fluid 50, which flows in the pipe 20, based on the temperature difference data. That is, using the numerical values of $T_1-T_3$, $T_2-T_4$, and $T_2-T_1$ representing the sets of temperature difference data, and using the numerical values of $R_1$ and $R_2$ representing the thermal resistances of the heat insulation agents 30A and 30B, respectively; the estimating unit 15c calculates the estimated value of in-pipe fluid temperature $T_{inner}$. Meanwhile, under the condition that the deposit 60 is not formed inside the pipe 20, using the numerical values of $T_1-T_3$, $T_2-T_4$, and $T_2-T_1$ representing the sets of temperature difference data, using the numerical value of $R_{pipe}$ representing the thermal resistance of the pipe 20, and using the numerical values of $R_1$ and $R_2$ representing the thermal resistances of the heat insulation agents 30A and 30B, respectively; the estimating unit 15c can also calculate the estimated value of the thermal resistance $R_{innht}$ of the fluid 50.

2. Configuration of Temperature Sensors 40

Each of the temperature sensors 40 (40A-1, 40A-2, 40B-1, and 40B-2) includes function units such as a measuring unit (not illustrated) that measures the temperature, and a transceiving unit (not illustrated) that controls sending a variety of data to and receiving a variety of data from other devices.

Measuring Unit

The measuring unit of the temperature sensor 40A-1 obtains, from among the first-type temperature data, the temperature data of the pipe surface on the outside of the first-type position of the pipe 20, the temperature data of the inside of the cladding, and the air temperature. That is, the measuring unit of the temperature sensor 40A-1 obtains the temperature $T_1$ ($T_5$) representing the pipe surface temperature or the temperature of the inside of the heat insulation agent 30 near the pipe surface, and obtains the temperature data of the temperature $T_6$ representing the air temperature or the out-of-pipe fluid temperature. The measuring unit of the temperature sensor 40A-2 obtains, from among the first-type temperature data, the temperature data of the pipe surface on the outside of the first-type position of the pipe 20, the temperature data of the inside of the cladding, and the air temperature. That is, the measuring unit of the temperature sensor 40A-2 obtains the temperature data of the temperature $T_3$ representing the heat-insulation-agent surface temperature or the temperature of the inside of the heat insulation agent 30 near the heat insulation agent surface, and obtains the temperature data of the temperature $T_6$ representing the air temperature or the out-of-pipe fluid temperature.

The measuring unit of the temperature sensor 40B-1 obtains, from among the second-type temperature data, the temperature data of the pipe surface on the outside of the second-type position of the pipe 20, the temperature data of the inside of the cladding, and the air temperature. That is, the measuring unit of the temperature sensor 40B-1 obtains the temperature data of the temperature $T_2$ representing the pipe surface temperature or the temperature of the inside of the heat insulation agent 30 near the pipe surface, and obtains the temperature data of the temperature $T_6$ representing the air temperature or the out-of-pipe fluid temperature. The measuring unit of the temperature sensor 40B-2 obtains, from among the second-type temperature data, the temperature data of the cladding surface on the outside of the second-type position of the pipe 20, the temperature data of the inside of the cladding, and the air temperature. That is, the measuring unit of the temperature sensor 40B-2 obtains the temperature data of the temperature $T_4$ representing the heat-insulation-agent surface temperature or the temperature of the inside of the heat insulation agent 30 near the heat insulation agent surface, and obtains the temperature data of the temperature $T_6$ representing the air temperature or the out-of-pipe fluid temperature.

Transceiving Unit

The transceiving unit of each temperature sensor 40 (40A-1, 40A-2, 40B-1, and 40B-2) sends the temperature data, which is measured by the corresponding measuring unit, to the estimation device 10. That is, the transceiving unit of the temperature sensors 40 send the temperature data of the measured temperatures $T_1$ to $T_6$ to the estimation device 10.

3. Configuration of Other Devices

A heat flux meter (not illustrated) is installed in each of the heat insulation agents 30A and 30B. Moreover, the heat flux meter can also be installed on such surface of the pipe 20 on which the heat insulation agent is not provided. Each heat flux meter includes a measuring unit that measures the heat flux data, and a transceiving unit (not illustrated) that controls sending a variety of data to and receiving a variety of data from other devices. The measuring unit of each heat flux meter measures the heat flux data or the temperature data of the heat insulation agents 30A and 30B and the portion of the pipe 20 not covered by a heat insulation agent. The transceiving unit of each heat flux meter sends the heat flux data or the temperature data, which is measured by the corresponding measuring unit, to the estimation device 10.

Flow of Various Operations

Explained below with reference to FIGS. 3 to 7 is the flow of various operations according to one or more embodiments. The following explanation is given in the order of the flow of the overall operations according to one or more embodiments, the flow of a first-type obtaining operation, the flow of a second-type obtaining operation, the flow of a deposit thickness estimation operation, and the flow of an in-pipe fluid temperature estimation operation.

1. Flow of Overall Operations

Figure 3:
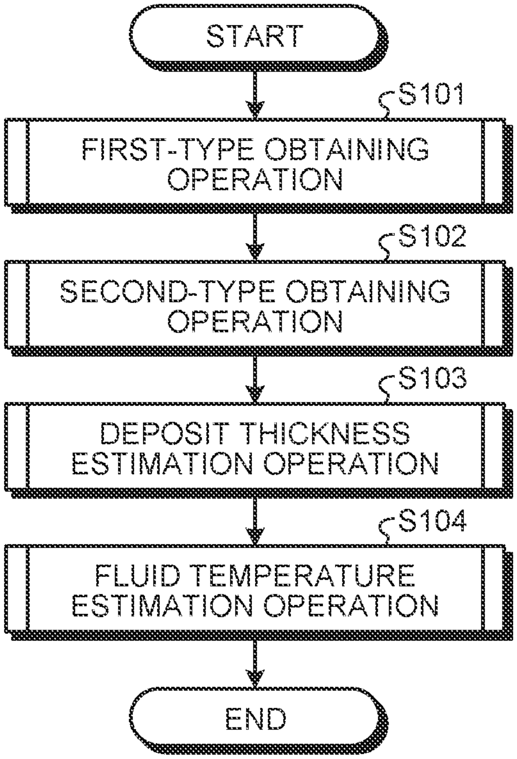
FIG. 3 is a flowchart for explaining an exemplary flow of the overall operations according to one or more embodiments.

Explained below with reference to FIG. 3 is the flow of the overall operations according to one or more embodiments. FIG. 3 is a flowchart for explaining an exemplary flow of the overall operations according to one or more embodiments. Firstly, the first obtaining unit 15*a* of the estimation device 10 performs the first-type obtaining operation representing the operation for obtaining the first-type temperature data (Step S101). Then, the second obtaining unit 15*b* of the estimation device 10 performs the second-type obtaining operation representing the operation for obtaining the second-type temperature data (Step S102). Subsequently, the estimating unit 15*c* of the estimation device 10 performs the deposit thickness estimation operation (Step S103). Moreover, the estimating unit 15*c* performs the in-pipe fluid temperature estimation operation (Step S104). It marks the end of the operations.

Herein, the operations at Steps S101 and S102 can be performed simultaneously, or the operation at Step S101 can be performed after performing the operation at Step S102. In an identical manner, the operations at Steps S103 and S104 can be performed simultaneously, or the operation at Step S103 can be performed after performing the operation at Step S104. Moreover, either the operation at Step S103 or the operation at Step S104 can be skipped.

2. Flow of First-Type Obtaining Operation

Figure 4:
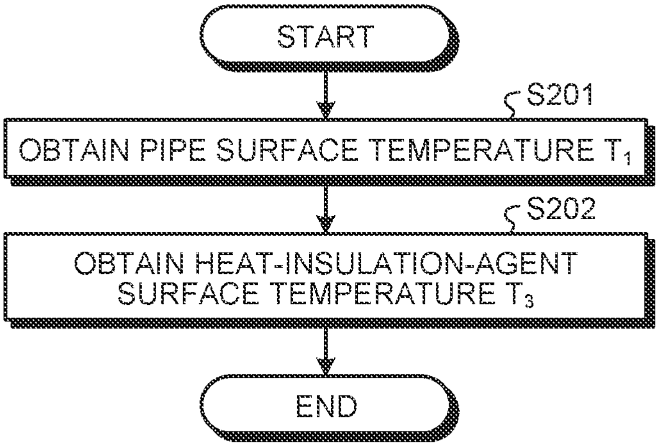
FIG. 4 is a flowchart for explaining an exemplary flow of a first-type obtaining operation according to one or more embodiments.

Explained below with reference to FIG. 4 is the flow of the first-type obtaining operation. FIG. 4 is a flowchart for explaining an exemplary flow of the first-type obtaining operation according to one or more embodiments. Firstly, the first obtaining unit 15*a* of the estimation device 10 obtains the pipe surface temperature $T_1$ from the temperature sensor 40A-1 that is installed on the surface of the pipe 20 at the position corresponding to the deposit formation position at which the deposit 60 is formed (i.e., the first deposit formation position) (Step S201). Then, the first obtaining unit 15*a* obtains the pipe surface temperature $T_3$ from the temperature sensor 40A-2 that is installed on the surface of the heat insulation agent 30A which covers the pipe 20 at the position corresponding to the deposition formation position at which the deposit 60 is formed (Step S202). It marks the end of the operations. Herein, the operations at Steps S201 and S202 can be performed simultaneously, or the operation at Step S201 can be performed after performing the operation at Step S202.

3. Flow of Second-Type Obtaining Operation

Figure 5:
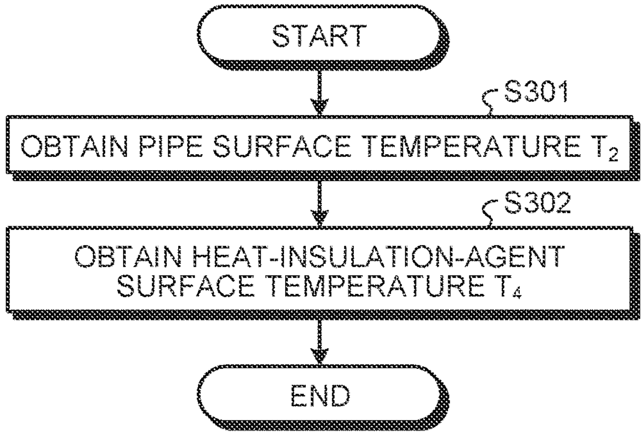
FIG. 5 is a flowchart for explaining an exemplary flow of a second-type obtaining operation according to one or more embodiments.

Explained below with reference to FIG. 5 is the flow of the second-type obtaining operation according to one or more embodiments. FIG. 5 is a flowchart for explaining an exemplary flow of the second-type obtaining operation according to one or more embodiments. Firstly, the second obtaining unit 15*b* of the estimation device 10 obtains the pipe surface temperature $T_2$ from the temperature sensor 40B-1 that is installed on the surface of the pipe 20 at the position corresponding to the deposit formation position at which the deposit 60 is formed (i.e., the second deposit formation position) and which is different than the first deposit formation position (Step S301). Then, the second obtaining unit 15*b* obtains the pipe surface temperature $T_4$ from the temperature sensor 40B-2 that is installed on the surface of the heat insulation agent 30B which covers the pipe 20 at the position corresponding to the deposition formation position at which the deposit 60 is formed (Step S302). It marks the end of the operations. Herein, the operations at Steps S301 and S302 can be performed simultaneously, or the operation at Step S301 can be performed after performing the operation at Step S302.

4. Flow of Deposit Thickness Estimation Operation

Figure 6:
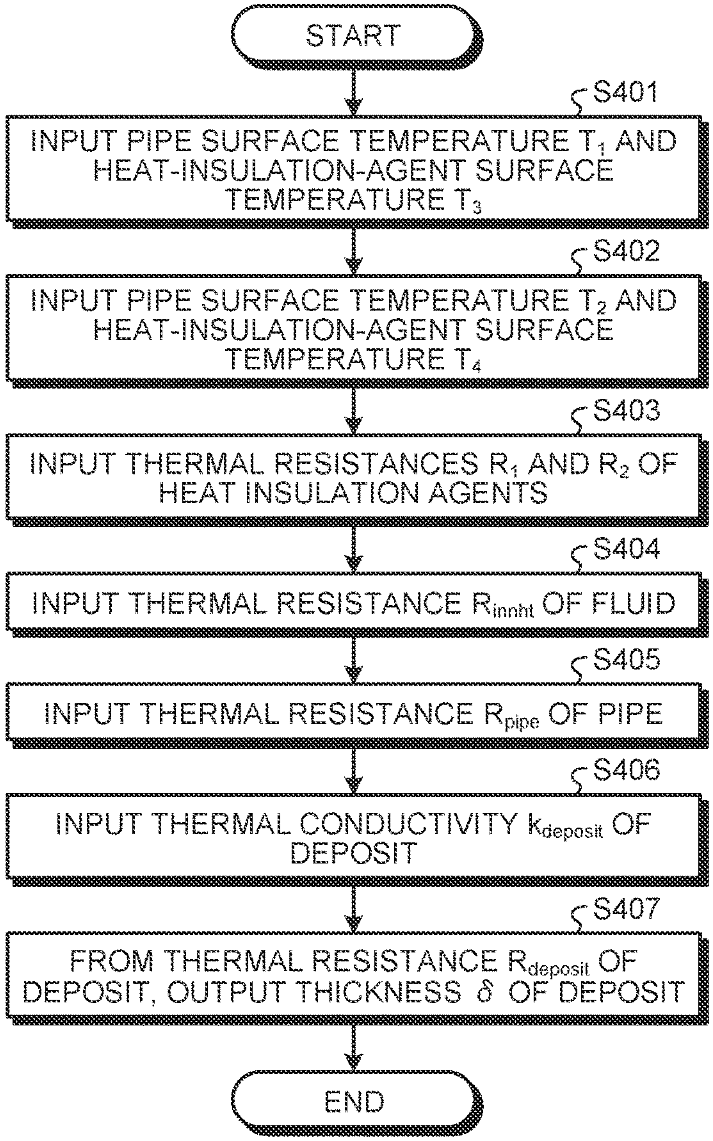
FIG. 6 is a flowchart for explaining an exemplary flow of a deposit thickness estimation operation according to one or more embodiments.

Explained below with reference to FIG. 6 is the deposit thickness estimation operation according to one or more embodiments. FIG. 6 is a flowchart for explaining an exemplary flow of the deposit thickness estimation operation according to one or more embodiments. In the following explanation, a deposit thickness estimation method according to one or more embodiments is explained with reference to mathematical expressions, and that is followed by the detailed explanation of the deposit thickness estimation operation according to one or more embodiments.

Deposit Thickness Estimation Method

Given below is the explanation of an example of the method for estimating the deposit thickness from the pipe surface temperature and the heat-insulation-agent surface temperature at the deposit formation positions at which the heat insulation agents have different thicknesses. Herein, when $T_1$ represents the pipe surface temperature obtained by the first obtaining unit 15*a*, $T_3$ represents the heat-insulation-agent surface temperature of the heat insulation agent 30A, $T_2$ represents the pipe surface temperature obtained by the second obtaining unit 15*b*, and $T_4$ represents the heat-insulation-agent surface temperature of the heat insulation agent 30B; the heat movement amounts $Q_1$ and $Q_2$ from the fluid 50 toward the outside of the pipe at the positions of the heat insulation agents 30A and 30B, respectively, are expressed as given below by taking into account the movement of heat from the in-pipe fluid 50 to the pipe surface.

$$Q_1 = \frac{T_{inner} - T_1}{R_{deposit} + R_{pipe} + R_{innht}} \tag{1}$$

$$Q_2 = \frac{T_{inner} - T_2}{R_{deposit} + R_{pipe} + R_{innht}} \tag{2}$$

Herein, $T_{inner}$ represents the in-pipe fluid temperature; $R_{deposit}$ represents the thermal resistance of the deposit 60; $R_{pipe}$ represents the thermal resistance of the pipe 20; and $R_{innht}$ represents the thermal resistance attributed to the heat transfer of the fluid 50 inside the pipe. Moreover, by taking into account the movement of heat from the pipe surface to the heat insulation agent surface, regarding the heat movement amounts $Q_1$ and $Q_2$, relationships given below in Equation (3) and (4) are obtained.

$$Q_1 = \frac{T_1 - T_3}{R_1} \tag{3}$$

$$Q_2 = \frac{T_2 - T_4}{R_2} \tag{4}$$

Herein, $R_1$ and $R_2$ represent the thermal resistances of the heat insulation agents 30A and 30B, respectively. From Equation (1) to Equation (4) given above, the thermal resistance $R_{deposit}$ of the deposit 60 can be calculated as given below in Equation (5).

$$R_{deposit} = \frac{R_1 R_2 (T_2 - T_1)}{R_2(T_1 - T_3) - R_1(T_2 - T_4)} - R_{innht} - R_{pipe} \tag{5}$$

In an identical manner, from Equation (1) to Equation (4) given above, the in-pipe fluid temperature $T_{inner}$ can be calculated as given below in Equation (6).

$$T_{inner} = \frac{R_2(T_1 - T_3)T_2 - R_1(T_2 - T_4)T_1}{R_2(T_1 - T_3) - R_1(T_2 - T_4)} \tag{6}$$

The thermal resistances $R_1$ and $R_2$ of the heat insulation agents 30A, respectively, can be calculated as given below in Equation (7) and Equation (8), respectively, using the following: the thermal conductivities $k_{i1}$ and $k_{i2}$ and outer radii $r_{i1}$ and $r_{i2}$ of the heat insulation agents 30A and 30B, respectively, as stored in the memory unit 14; the outer radius $r_{po}$ of the pipe 20; and a length L in the pipe axis direction of the region taken into account for the movement of heat. Meanwhile, in Equation (7) and Equation (8), "ln" represents natural logarithm.

$$R_1 = \frac{\ln(r_{i1}/r_{po})}{2\pi k_{i1} L} \tag{7}$$

$$R_2 = \frac{\ln(r_{i2}/r_{po})}{2\pi k_{i2} L} \tag{8}$$

Meanwhile, the values of the thermal resistances $R_1$ and $R_2$ can be recorded in the memory unit 14. The thermal resistance $R_{pipe}$ of the pipe 20 can be calculated as given below in Equation (9) using the inner radius $r_{pi}$ of the pipe 20 and the thermal conductivity $k_p$ inside the pipe 20. In Equation (9), "ln" represents natural logarithm.

$$R_{pipe} = \frac{\ln(r_{po}/r_{pi})}{2\pi k_p L} \tag{9}$$

Moreover, the thermal resistance $R_{innht}$ attributed to the heat transfer of the fluid 50 inside the pipe 20 can be calculated as given below in Equation (10) using the heat transfer coefficient $h_{inner}$ inside the pipe 20.

$$R_{innht} = \frac{1}{2\pi r_{pi} h_{inner} L} \tag{10}$$

At that time, the deposit thickness δ and the thermal resistance $R_{deposit}$ of the deposit 60 have the relationship as given below in Equation (11). The inner radius $r_{pi}$ of the pipe 20 corresponds to the outer radius of the deposit 60, and $r_{pi}$-δ corresponds to the inner radius of the deposit 60. According to Equation (11) given below, greater the numerical value of the deposit thickness δ, the greater is the numerical value of the thermal resistance $R_{deposit}$ of the deposit 60. In Equation (11), "ln" represents natural logarithm.

$$R_{deposit} = \frac{\ln(r_{pi}/r_{pi} - \delta)}{2\pi k_{deposit} L} \tag{11}$$

As explained above, using the thermal conductivity $k_{deposit}$ of the deposit 60 as stored in the memory unit 14, the thickness of the deposit 60 can be calculated from the thermal resistance $R_{deposit}$ of the deposit 60.

Flow of Estimation Operation

Explained below with reference to FIG. 6 is an example of the deposit thickness estimation operation. Firstly, the estimating unit 15*c* of the estimation device 10 receives input of the pipe surface temperature $T_1$ and the heat-insulation-agent surface temperature $T_3$ corresponding to the first deposit formation position (Step S401). Secondly, the estimating unit 15*c* receives input of the pipe surface temperature $T_2$ and the heat-insulation-agent surface temperature $T_4$ corresponding to the second deposit formation position (Step S402). Thirdly, the estimating unit 15*c* receives input of $R_1$ and $R_2$ as the numerical values of the thermal resistance of the heat insulation agents 30A and 30B, respectively (Step S403). Fourthly, the estimating unit 15*c* receives input of $R_{innht}$ as the numerical value of the thermal resistance of the fluid 50 (Step S404). Fifthly, the estimating unit 15*c* receives $R_{pipe}$ as the numerical value of the thermal resistance of the pipe 20 (Step S405). Sixthly, the estimating unit 15*c* receives input of the thermal conductivity $k_{deposit}$ of the deposit 60 and the inner radius $r_{pi}$ of the pipe 20 (Step S406). Seventhly, from the numerical value of the thermal resistance $R_{deposit}$ of the deposit 60, the estimating unit 15*c* outputs the numerical value of the deposit thickness δ (Step S407).

The estimating unit 15*c* performs the operations from Step S401 to Step S407, and then ends the deposit thickness estimation operation. Herein, the sequence and the execution timings of the input reception operations performed from Step S401 to Step S406 can be varied either dynamically or statically.

5. Flow of In-Pipe Fluid Temperature Estimation Operation

Figure 7:
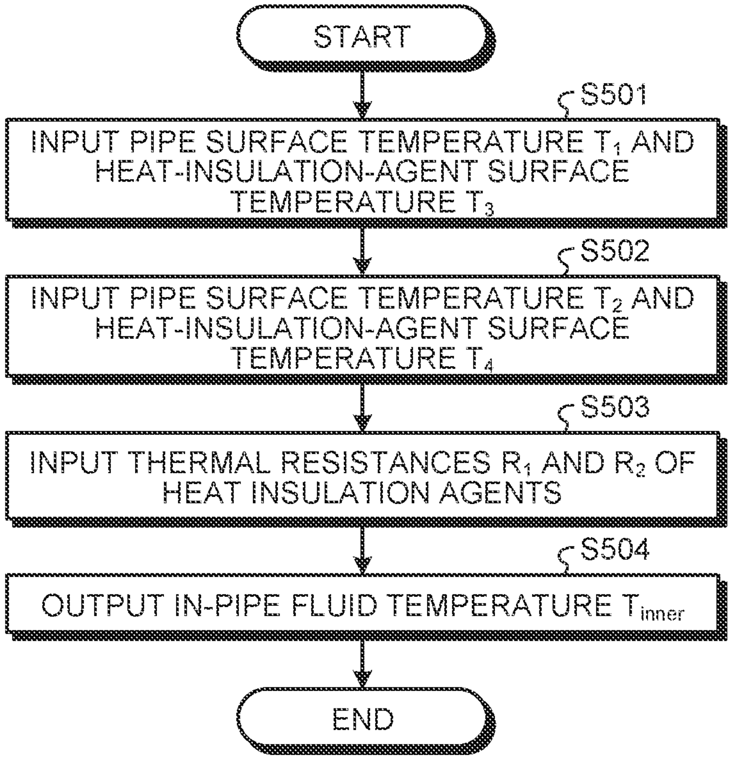
FIG. 7 is a flowchart for explaining an exemplary flow of an in-pipe fluid temperature estimation operation according to one or more embodiments.

Explained below with reference to FIG. 7 is the in-pipe fluid temperature estimation operation according to one or more embodiments. FIG. 7 is a flowchart for explaining an exemplary flow of the in-pipe fluid temperature estimation operation according to one or more embodiments. Firstly, the estimating unit 15*c* of the estimating device 10 receives input of the pipe surface temperature $T_1$ and the heat-insulation-agent surface temperature $T_3$ corresponding to the first deposit formation position (Step S501). Secondly, the estimating unit 15*c* receives input of the pipe surface temperature $T_2$ and the heat-insulation-agent surface temperature $T_4$ corresponding to the second deposit formation position (Step S502). Thirdly, the estimating unit 15*c* receives input of $R_1$ and $R_2$ as the numerical values of the thermal resistance of the heat insulation agents 30A and 30B, respectively (Step S503). Fourthly, the estimating unit 15*c* outputs the numerical value of the temperature $T_{inner}$ of the fluid 50 inside the pipe 20 (Step S504). During the estimation operation for estimating the in-pipe fluid temperature $T_{inner}$, the calculation is performed using Equation (6) given earlier.

The estimating unit 15*c* performs the operations from Step S501 to Step S504 explained above, and then ends the deposit thickness estimation operation. Herein, the sequence and the execution timings of the input reception operations performed from Step S501 to Step S503 can be varied either dynamically or statically.

Specific Examples of Pipe and Temperature Sensor

Explained below with reference FIGS. 8 to 21 are specific examples of the arrangement and the usage of the pipe and the temperature sensors. With reference to specific examples 1 to 10, the explanation is given about the estimation operation performed in a pipe in which the temperature sensors are arranged to measure the temperature of at least four points. With reference to specific examples 11 to 14, the explanation is given about the estimation operation performed in a pipe in which the temperature sensors are arranged to measure the temperature of at least three points.

1. Specific Example 1

Figure 8:
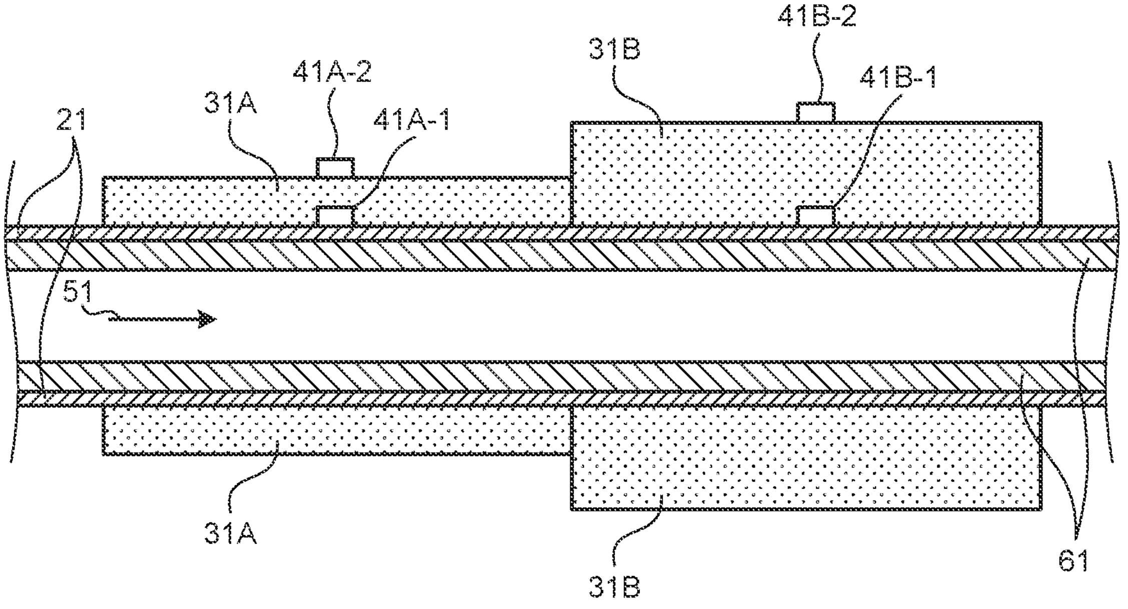
FIG. 8 is a cross-sectional view of a specific example 1 of a pipe and temperature sensors according to one or more embodiments.

Explained below with reference to FIG. 8 is an example in which the estimation operation is performed in a pipe having the temperature sensors arranged to measure the temperature of four points, and in which two pairs of temperature data are obtained. FIG. 8 is a cross-sectional view of the specific example 1 of a pipe and temperature sensors according to one or more embodiments. In FIG. 8 is illustrated the cross-sectional surface in the pipe axis direction of a pipe 21 which is covered by heat insulation agents 31A and 31B having different thicknesses and in which a deposit 61 gets evenly formed because of the flow of a fluid 51. Moreover, temperature sensors 41A (41A-1 and 41A-2) are installed on the heat insulation agent 31A, and temperature sensors 41B (41B-1 and 41B-2) are installed on the heat insulation agent 31B. The temperature sensors 41A-1 and 41A-2 are installed in the same radial direction of the pipe 21, and the temperature sensors 41B-1 and 41B-2 are installed at such positions in the same radial direction of the pipe 21 which are different from the positions of the temperature sensors 41A.

Thus, the estimation device 10 can estimate the deposit thickness by measuring the pipe surface temperature and the heat-insulation-agent surface temperature for each type of heat insulation agent having a different thickness as illustrated in FIG. 8 and having a different thermal resistance. That is, firstly, as the first-type temperature data at the first-type position, the estimation device 10 obtains the temperature $T_1$ measured by the temperature sensor 41A-1 as the pipe surface temperature of the heat insulation agent 31A, and obtains the temperature $T_3$ measured by the temperature sensor 41A-2 as the heat-insulation-agent surface temperature of the heat insulation agent 31A. Moreover, as the second-type temperature data at the second-type position, the estimation device 10 obtains the temperature $T_2$ measured by the temperature sensor 41B-1 as the pipe surface temperature of the heat insulation agent 31B, and obtains the temperature $T_4$ measured by the temperature sensor 41B-2 as the heat-insulation-agent surface temperature of the heat insulation agent 31B.

Then, using the obtained temperature data of the temperatures $T_1$ to $T_4$, the stored thermal resistance $R_{innht}$ of the fluid 51, the stored thermal resistance $R_{pipe}$ of the pipe 21, and the stored thermal resistances $R_1$ and $R_2$ of the heat insulation agents 31A and 31B, respectively; the estimation device 10 obtains the thermal resistance $R_{deposit}$ of the deposit 61 according to Equation (5) given earlier. Subsequently, using the stored thermal conductivity $k_{deposit}$ of the deposit 61, the estimation device 10 estimates the thickness δ of the deposit 61. Moreover, using the temperature data of the temperatures $T_1$ to $T_4$ and the thermal resistances $R_1$ and $R_2$ of the heat insulation agents 31A and 31B, respectively; the estimation device 10 can estimate the temperature $T_{inner}$ of the fluid 51 according to Equation (6) given earlier.

2. Specific Example 2

Figure 9:
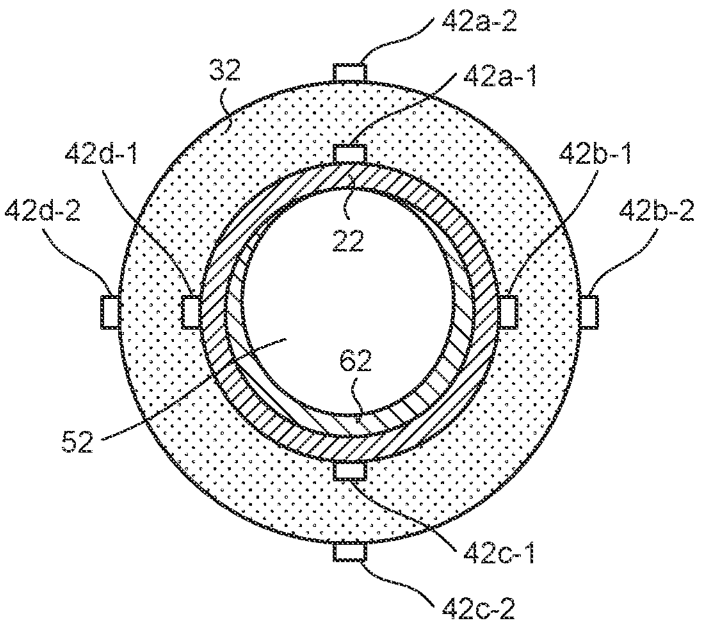
FIG. 9 is a cross-sectional view of a specific example 2 of a pipe and temperature sensors according to one or more embodiments.

Explained below with reference to FIG. 9 is an example in which the estimation operation is performed in a pipe having the temperature sensors arranged to measure the temperature of four points, and in which three or more pairs of temperature data are obtained. FIG. 9 is a cross-sectional view of the specific example 2 of a pipe and temperature sensors according to one or more embodiments. In FIG. 9 is illustrated the cross-sectional surface in a radial direction of a pipe 22 which is covered by a heat insulation agent 32 and by a heat insulation agent (not illustrated) having a different thickness than the thickness of the heat insulation agent 32 and in which a deposit 62 gets unevenly formed because of the flow of a fluid 52. Moreover, temperature sensors 42*a* (42*a*-1 and 42*a*-2), temperature sensors 42*b* (42*b*-1 and 42*b*-2), temperature sensors 42*c* (42*c*-1 and 42*c*-2), and temperature sensors 42*d* (42*d*-1 and 42*d*-2) are installed at positions in mutually different radial directions of the heat insulation agent 32.

As illustrated in FIG. 9, the estimation device 10 measures the pipe surface temperature and the heat-insulation-agent surface temperature at a plurality of points on a circle. Hence, even when the deposit is unevenly formed in a circumferential direction, the deposit thickness can be estimated with accuracy. At that time, if the surface temperature measurement for only one heat insulation agent is performed at a large number of points; then, for the other heat insulation agent, it is sufficient to measure the pipe surface temperature and the heat-insulation-agent surface temperature only at a single point each. That is, for example, the estimation device 10 not only can obtain the pair of temperature data $T_1$ and $T_3$ measured by the temperature sensors 42*a* (42*a*-1 and 42*a*-2), but can also obtain the pair of temperature data $T_1$ and $T_3$ measured by the temperature sensors 42*c* (42*c*-1 and 42*c*-2); and can use any one pair of temperature data as the first-type temperature data. At that time, for example, the estimation device 10 can use, as the second-type temperature data, the pair of temperature data $T_2$ and $T_4$ measured by temperature sensors (not illustrated) installed on the other heat insulation agent (not illustrated) that has a different thickness than the thickness of the heat insulation agent 32. Moreover, the estimation device 10 can obtain the second-type temperature data from the temperature data of a plurality of points.

Then, in an identical manner to the specific example 1 explained earlier, using the temperature data of the temperatures $T_1$ to $T_4$, the stored thermal resistance $R_{innht}$ of the fluid 52, the stored thermal resistance $R_{pipe}$ of the pipe 22, and the stored thermal resistances $R_1$ and $R_2$ of the heat insulation agent 32 and the other heat insulation agent, respectively; the estimation device 10 obtains the thermal resistance $R_{deposit}$ of the deposit 62 according to Equation (5) given earlier. Subsequently, using the stored thermal conductivity $k_{deposit}$ of the deposit 62, the estimation device 10 estimates the thickness δ of the deposit 62. Moreover, using the temperature data of the temperatures $T_1$ to $T_4$ and the thermal resistances $R_1$ and $R_2$ of the heat insulation agent 32 and the other heat insulation agent, respectively; the estimation device 10 can estimate the temperature $T_{inner}$ of the fluid 52 according to Equation (6) given earlier.

3. Specific Example 3

Figure 10:
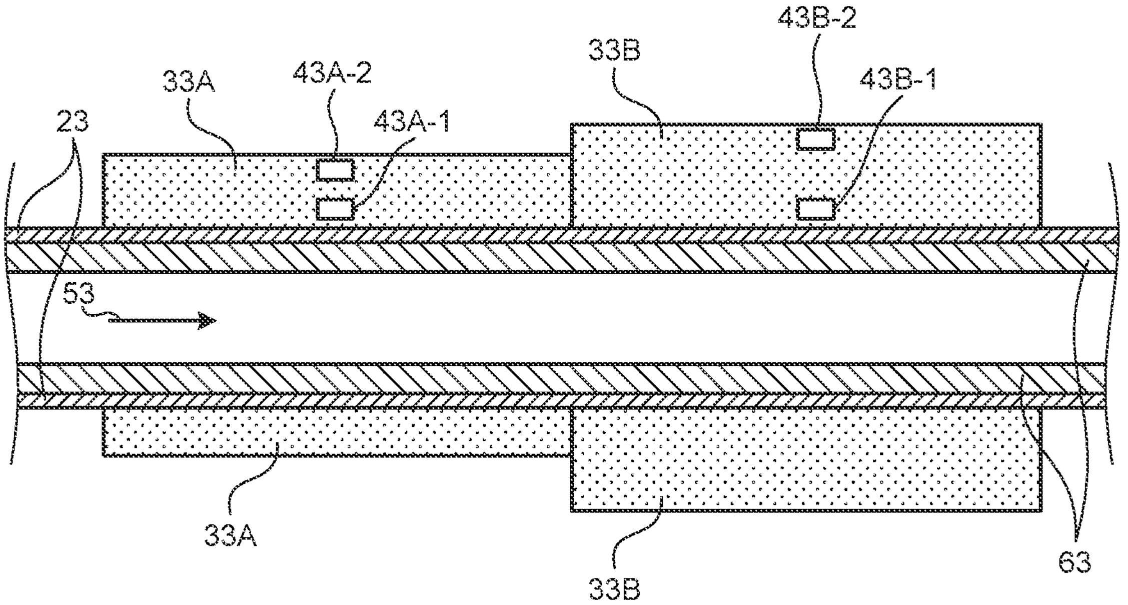
FIG. 10 is a cross-sectional view of a specific example 3 of a pipe and temperature sensors according to one or more embodiments.

Explained below with reference to FIG. 10 is an example in which the estimation operation is performed in a pipe having the temperature sensors arranged to measure the temperature of four points, and in which two pairs of temperature data of the inside of the heat insulation agents are obtained. FIG. 10 is a cross-sectional view of the specific example 3 of a pipe and temperature sensors according to one or more embodiments. In FIG. 10 is illustrated the cross-sectional surface in the pipe axis direction of a pipe 23 which is covered by heat insulation agents 33A and 33B having different thicknesses and in which a deposit 63 gets evenly formed because of the flow of a fluid 53. Moreover, temperature sensors 43A (43A-1 and 43A-2) are installed in the heat insulation agent 33A, and temperature sensors 43B (43B-1 and 43B-2) are installed in the heat insulation agent 33B. The temperature sensors 43A-1 and 43A-2 are installed in the same radial direction of the pipe 23, and the temperature sensors 43B-1 and 43B-2 are installed at such positions in the same radial direction of the pipe 23 which are different from the positions of the temperature sensors 43A.

Thus, the estimation device 10 can estimate the deposit thickness by measuring the temperature data of a plurality of points inside each heat insulation agent having a different thickness as illustrated in FIG. 10 and having a different thermal resistance. That is, as the first-type temperature data at the first-type position, the estimation device 10 obtains the temperature $T_1$ measured by the temperature sensor 43A-1 as the temperature of the inside of the heat insulation agent 33A near the pipe surface, and obtains the temperature $T_3$ measured by the temperature sensor 43A-2 as the temperature of the inside of the heat insulation agent 33A near the heat insulation agent surface. Moreover, as the second-type temperature data at the second-type position, the estimation device 10 obtains the temperature $T_2$ measured by the temperature sensor 43B-1 as the temperature of the inside of the heat insulation agent 33B near the pipe surface, and obtains the temperature $T_4$ measured by the temperature sensor 43B-2 as the temperature of the inside of the heat insulation agent 33B near the heat insulation surface. Then, in an identical manner to the specific example 1 explained earlier, the estimation device 10 estimates the thickness δ of the deposit 63 and estimates the temperature $T_{inner}$ of the fluid 53.

4. Specific Example 4

Figure 11:
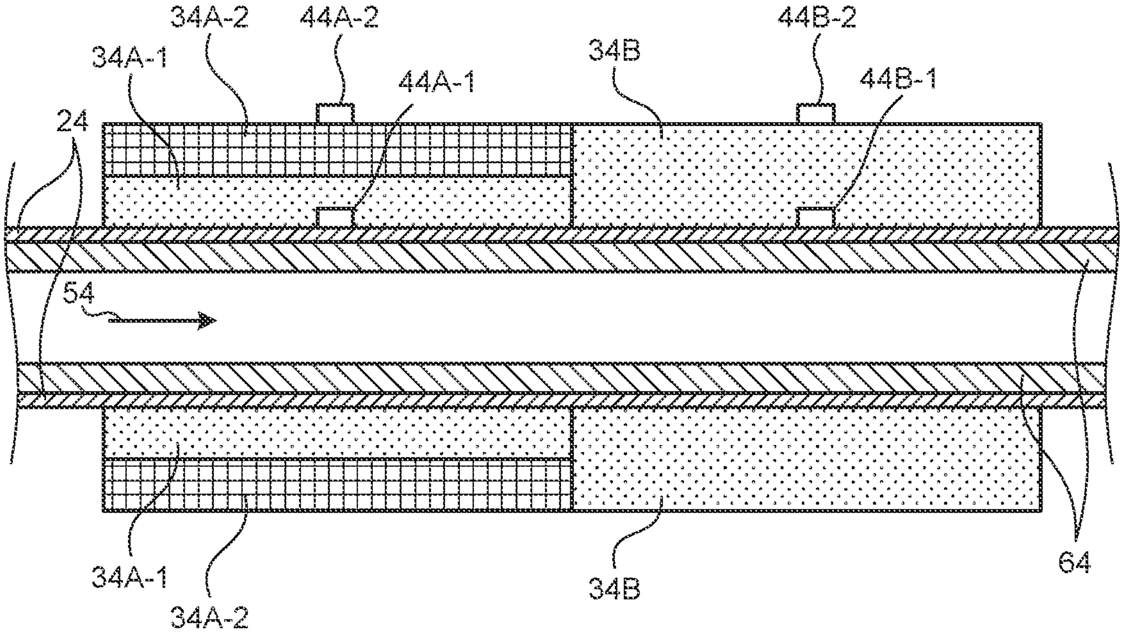
FIG. 11 is a cross-sectional view of a specific example 4 of a pipe and temperature sensors according to one or more embodiments.

Explained below with reference to FIG. 11 is an example in which the estimation operation is performed in a pipe having the temperature sensors arranged to measure the temperature of four points, and in which two pairs of temperature data are obtained from heat insulation agents made from different materials. FIG. 11 is a cross-sectional view of the specific example 4 of a pipe and temperature sensors according to one or more embodiments. In FIG. 11 is illustrated the cross-sectional surface in the pipe axis direction of a pipe 24 which is covered by heat insulation agents 34A (34A-1 and 34A-2) and 34B made from different materials, and in which a deposit 64 gets evenly formed because of the flow of a fluid 54. Moreover, temperature sensors 44A (44A-1 and 44A-2) are installed on the heat insulation agent 34A, and temperature sensors 44B (44B-1 and 44B-2) are installed on the heat insulation agent 34B. The temperature sensors 44A-1 and 44A-2 are installed in the same radial direction of the pipe 24, and the temperature sensors 44B-1 and 44B-2 are installed at such positions in the same radial direction of the pipe 24 which are different from the positions of the temperature sensors 44A.

Thus, the estimation device 10 can estimate the deposit thickness by measuring the pipe surface temperature and the heat-insulation-agent surface temperature for each heat insulation agent made from a different material as illustrated in FIG. 11 and having a different thermal resistance. At that time, the heat insulation agents 34A and 34B can have different thicknesses as well as can be made from different materials. Moreover, as far as the materials of the heat insulation agents 34A and 34B is concerned, it is possible to use a material such as plastic or a metal having high thermal conductivity. Meanwhile, the heat insulation agents 34A and 34B need not be made from the same material. For example, as illustrated in FIG. 11, the heat insulation agent 34 can have a double-layered structure, and one of the layers can have a different material than the material of the heat insulation agent 34B.

The installation positions of the temperature sensors 44A can be set in between the two layers of heat insulation agents. Moreover, a heat insulation agent can have a multilayered structure of three or more layers. The layers can include a material such as plastic or a metal having high thermal conductivity, Moreover, a circuit board for temperature measurement or communication and a power source can also be included in the layers. Furthermore, the heat insulation agent can be partially or entirely covered by a container made of a metal, and the temperature sensors 44A can be installed inside that container.

With reference to FIG. 11, firstly, as the first-type temperature data at the first-type position, the estimation device 10 obtains the temperature $T_1$ measured by the temperature sensor 44A-1 as the pipe surface temperature of the heat insulation agent 34A (34A-1), and obtains the temperature $T_3$ measured by the temperature sensor 44A-2 as the heat-insulation-agent surface temperature of the heat insulation agent 34A (34A-2). Moreover, as the second-type temperature data at the second-type position, the estimation device 10 obtains the temperature $T_2$ measured by the temperature sensor 44B-1 as the pipe surface temperature of the heat insulation agent 34B, and obtains the temperature $T_4$ measured by the temperature sensor 44B-2 as the heat-insulation-agent surface temperature of the heat insulation agent 34B.

Then, using the obtained temperature data of the temperatures $T_1$ to $T_4$, the stored thermal resistance $R_{innht}$ of the fluid 54, the stored thermal resistance $R_{pipe}$ of the pipe 24, the thermal resistance $R_1$ of the heat insulation agents 34A in entirety, and the thermal resistance $R_2$ of the heat insulation agent 34B; the estimation device 10 obtains the thermal resistance $R_{deposit}$ of the deposit 64 according to Equation (5) given earlier. Subsequently, using the stored thermal conductivity $k_{deposit}$ of the deposit 64, the estimation device 10 estimates the thickness δ of the deposit 64. Moreover, using the temperature data of the temperatures $T_1$ to $T_4$, the thermal resistance $R_1$ of the heat insulation agents 34A in entirety, and the thermal resistance $R_2$ of the heat insulation agent 34B; the estimation device 10 can estimate the temperature $T_{inner}$ of the fluid 54 according to Equation (6) given earlier.

5. Specific Example 5

Figure 12:
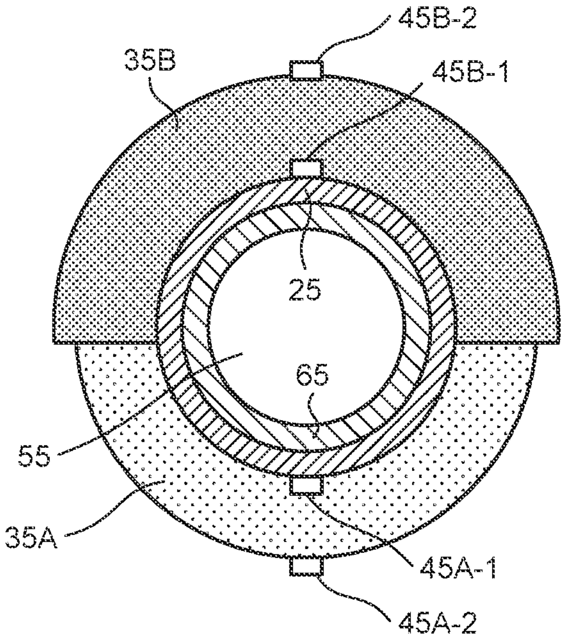
FIG. 12 is a cross-sectional view of a specific example 5 of a pipe and temperature sensors according to one or more embodiments.

Explained below with reference to FIG. 12 is an example in which the estimation operation is performed in a pipe having the temperature sensors arranged to measure the temperature of four points, and in which two pairs of temperature data are obtained from heat insulation agents made from different materials and that are placed at the same position in the pipe axis direction. FIG. 12 is a cross-sectional view of the specific example 5 of a pipe and temperature sensors according to one or more embodiments. In FIG. 12 is illustrated the cross-sectional surface in a radial direction of a pipe 25 which, at the same position in the pipe axis direction, is covered by heat insulation agents 35A and 35B having different thicknesses on the lower and upper sides of the pipe 25 and in which a deposit 65 gets evenly formed because of the flow of a fluid 55. The heat insulation agents 35A and 35B have different thicknesses and are made from different materials. Moreover, temperature sensors 45A (45A-1 and 45A-2) are installed on the heat insulation agent 35A, and temperature sensors 45B (45B-1 and 45B-2) are installed on the heat insulation agent 35B. The temperature sensors 45A-1 and 45A-2 are installed in the same radial direction of the pipe 25. In an identical manner, the temperature sensors 45B-1 and 45B-2 are also installed in the same radial direction of the pipe 25.

Thus, as illustrated in FIG. 12, even if the heat insulation agents are not placed at different positions in the pipe axis direction, the estimation device 10 can estimate the deposit thickness by measuring the pipe surface temperature and the heat-insulation-agent surface temperature for each heat insulation agent having a different thickness, a different material, a different shape, and a different layer count. That is, as the first-type temperature data at the first-type position, the estimation device 10 obtains the temperature $T_1$ measured by the temperature sensor 45A-1 as the pipe surface temperature of the heat insulation agent 35A positioned on the lower side of the pipe 25, and obtains the temperature $T_3$ measured by the temperature sensor 45A-2 as the heat-insulation-agent surface temperature of the heat insulation agent 35A. Moreover, as the second-type temperature data at the second-type position, the estimation device 10 obtains the temperature $T_2$ measured by the temperature sensor 45B-1 as the pipe surface temperature of the heat insulation agent 35B positioned on the upper side of the pipe 25, and obtains the temperature $T_4$ measured by the temperature sensor 45B-2 as the heat-insulation-agent surface temperature of the heat insulation agent 35B. Then, in an identical manner to the specific example 1 explained earlier, the estimation device 10 estimates the thickness δ of the deposit 65 and estimates the temperature $T_{inner}$ of the fluid 55.

6. Specific Example 6

Figure 13:
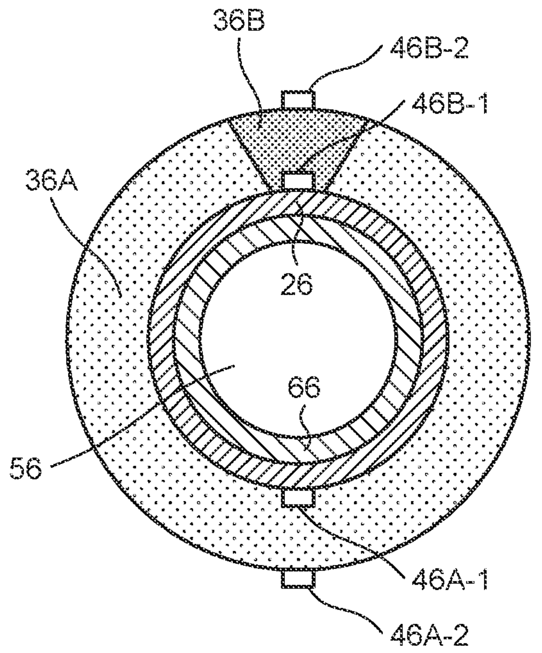
FIG. 13 is a cross-sectional view of a specific example 6 of a pipe and temperature sensors according to one or more embodiments.

Explained below with reference to FIG. 13 is an example in which the estimation operation is performed in a pipe having the temperature sensors arranged to measure the temperature of four points, and in which two pairs of temperature data are obtained from heat insulation agents that are partially made from different materials and that are placed at the same position in the pipe axis direction. FIG. 13 is a cross-sectional view of the specific example 6 of a pipe and temperature sensors according to one or more embodiments. In FIG. 13 is illustrated the cross-sectional surface in a radial direction of a pipe 26 in which, at the same position in the pipe axis direction, some part of a heat insulation agent 36A is replaced with a heat insulation agent 36B made from a different material, and in which a deposit 66 gets evenly formed because of the flow of a fluid 56. The heat insulation agents 36A and 36B are made from different materials. Moreover, temperature sensors 46A (46A-1 and 46A-2) are installed on the heat insulation agent 36A, and temperature sensors 46B (46B-1 and 46B-2) are installed on the heat insulation agent 36B. The temperature sensors 46A-1 and 46A-2 are installed in the same radial direction of the pipe 26. In an identical manner, the temperature sensors 46B-1 and 46B-2 are also installed in the same radial direction of the pipe 26.

Thus, as illustrated in FIG. 13, even if the heat insulation agents are not placed at different positions in the pipe axis direction, the estimation device 10 can estimate the deposit thickness by measuring the pipe surface temperature and the heat-insulation-agent surface temperature for each heat insulation agent having a different thickness, a different material, a different shape, and a different layer count. That is, as the first-type temperature data at the first-type position, the estimation device 10 obtains the temperature $T_1$ measured by the temperature sensor 46A-1 as the pipe surface temperature of the heat insulation agent 36A covering the entire pipe 26, and obtains the temperature $T_3$ measured by the temperature sensor 46A-2 as the heat-insulation-agent surface temperature of the heat insulation agent 36A. Moreover, as the second-type temperature data at the second-type position, the estimation device 10 obtains the temperature $T_2$ measured by the temperature sensor 46B-1 as the pipe surface temperature of the heat insulation agent 36B covering some part of the pipe 26, and obtains the temperature $T_4$ measured by the temperature sensor 46B-2 as the heat-insulation-agent surface temperature of the heat insulation agent 36B. Then, in an identical manner to the specific example 1 explained earlier, the estimation device 10 estimates the thickness δ of the deposit 66 and estimates the temperature $T_{inner}$ of the fluid 56.

7. Specific Example 7

Figure 14:
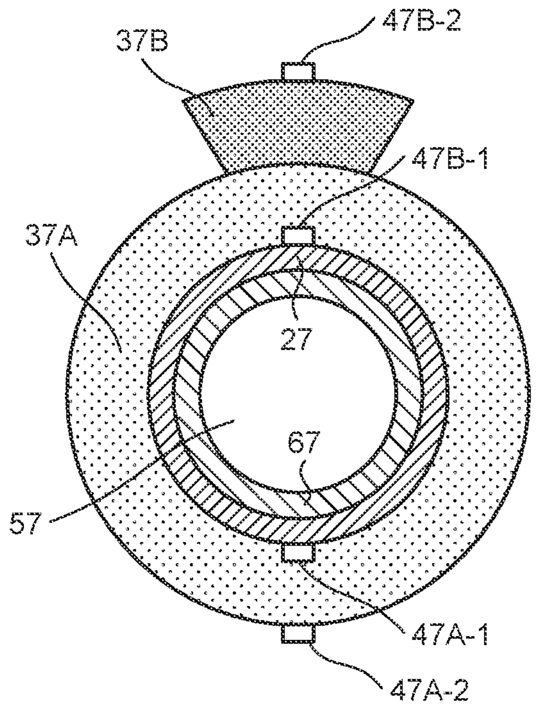
FIG. 14 is a cross-sectional view of a specific example 7 of a pipe and temperature sensors according to one or more embodiments.

Explained below with reference to FIG. 14 is an example in which the estimation operation is performed in a pipe having the temperature sensors arranged to measure the temperature of four points, and in which two pairs of temperature data are obtained from an additional heat insulation agent that is placed at the same position in the pipe axis direction. FIG. 14 is a cross-sectional view of the specific example 7 of a pipe and temperature sensors according to one or more embodiments. In FIG. 14 is illustrated the cross-sectional surface in a radial direction of a pipe 27 in which, at the same position in the pipe axis direction, a heat insulation agent 37B is added to some part of a heat insulation agent 37A that is homogeneous in nature, and in which a deposit 67 gets evenly formed because of the flow of a fluid 57. Moreover, temperature sensors 47A-1, 47A-2, and 47B-1 are installed on the heat insulation agent 37A, and a temperature sensor 47B-2 is installed on the heat insulation agent 37B. The temperature sensors 47A-1 and 47A-2 are installed in the same radial direction of the pipe 27. In an identical manner, the temperature sensors 47B-1 and 47B-2 are also installed in the same radial direction of the pipe 27.

Thus, as illustrated in FIG. 14, even if the heat insulation agents are not placed at different positions in the pipe axis direction, the estimation device 10 can estimate the deposit thickness by measuring the pipe surface temperature and the heat-insulation-agent surface temperature for each heat insulation agent having a different thickness, a different material, a different shape, and a different layer count. That is, as the first-type temperature data at the first-type position, the estimation device 10 obtains the temperature $T_1$ measured by the temperature sensor 47A-1 as the pipe surface temperature of the heat insulation agent 37A covering the entire pipe 27, and obtains the temperature $T_3$ measured by the temperature sensor 47A-2 as the heat-insulation-agent surface temperature of the heat insulation agent 37A. Moreover, as the second-type temperature data at the second-type position, the estimation device 10 obtains the temperature $T_2$ measured by the temperature sensor 47B-1 as the pipe surface temperature of the position at which the heat insulation agent 37B is added, and obtains the temperature $T_4$ measured by the temperature sensor 47B-2 as the heat-insulation-agent surface temperature of the position at which the heat insulation agent 37B is added. Then, in an identical manner to the specific example 1 explained earlier, the estimation device 10 estimates the thickness δ of the deposit 67 and estimates the temperature $T_{inner}$ of the fluid 57.

8. Specific Example 8

Figure 15:
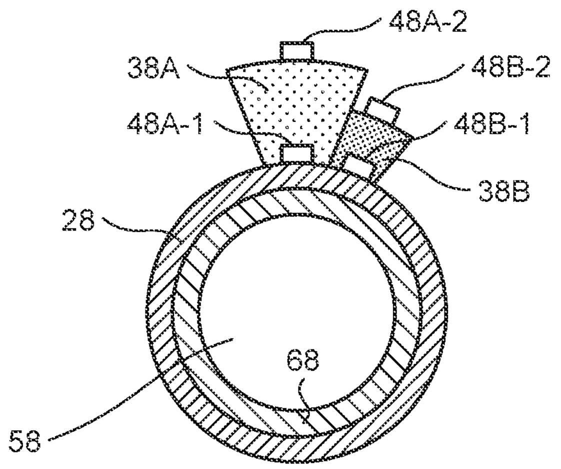
FIG. 15 is a cross-sectional view of a specific example 8 of a pipe and temperature sensors according to one or more embodiments.

Explained below with reference to FIG. 15 is an example in which the estimation operation is performed in a pipe having the temperature sensors arranged to measure the temperature of four points, and in which two pairs of temperature data are obtained from heat insulation agents that cover only some part of the pipe. FIG. 15 is a cross-sectional view of the specific example 8 of a pipe and temperature sensors according to one or more embodiments. In FIG. 15 is illustrated the cross-sectional surface in a radial direction of a pipe 28 in which, at the same position in the pipe axis direction, some part is covered by heat insulation agents 38A and 38B, and in which a deposit 68 gets evenly formed because of the flow of a fluid 58. The heat insulation agents 38A and 38B have different thicknesses and are made from different materials. Moreover, temperature sensors 48A (48A-1 and 48A-2) are installed on the heat insulation agent 38A, and temperature sensors 48B (48B-1 and 48B-2) are installed on the heat insulation agent 38B. The temperature sensors 48A-1 and 48A-2 are installed in the same radial direction of the pipe 28, and the temperature sensors 48B-1 and 48B-2 are installed at such positions in the same radial direction of the pipe 28 which are different from the positions of the temperature sensors 48A.

Thus, as illustrated in FIG. 15, even if the heat insulation agents are not placed at different positions in the pipe axis direction, the estimation device 10 can estimate the deposit thickness by measuring the pipe surface temperature and the heat-insulation-agent surface temperature for each heat insulation agent having a different thickness, a different material, a different shape, and a different layer count. That is, as the first-type temperature data at the first-type position, the estimation device 10 obtains the temperature $T_1$ measured by the temperature sensor 48A-1 as the pipe surface temperature of the heat insulation agent 38A covering some part of the pipe 28, and obtains the temperature $T_3$ measured by the temperature sensor 48A-2 as the heat-insulation-agent surface temperature of the heat insulation agent 38A. Moreover, as the second-type temperature data at the second-type position, the estimation device 10 obtains the temperature $T_2$ measured by the temperature sensor 48B-1 as the pipe surface temperature of the heat insulation agent 38B covering some part of the pipe 28, and obtains the temperature $T_4$ measured by the temperature sensor 48B-2 as the heat-insulation-agent surface temperature of the heat insulation agent 38B. Then, in an identical manner to the specific example 1 explained earlier, the estimation device 10 estimates the thickness δ of the deposit 68 and estimates the temperature $T_{inner}$ of the fluid 58.

9. Specific Example 9

Figure 16:
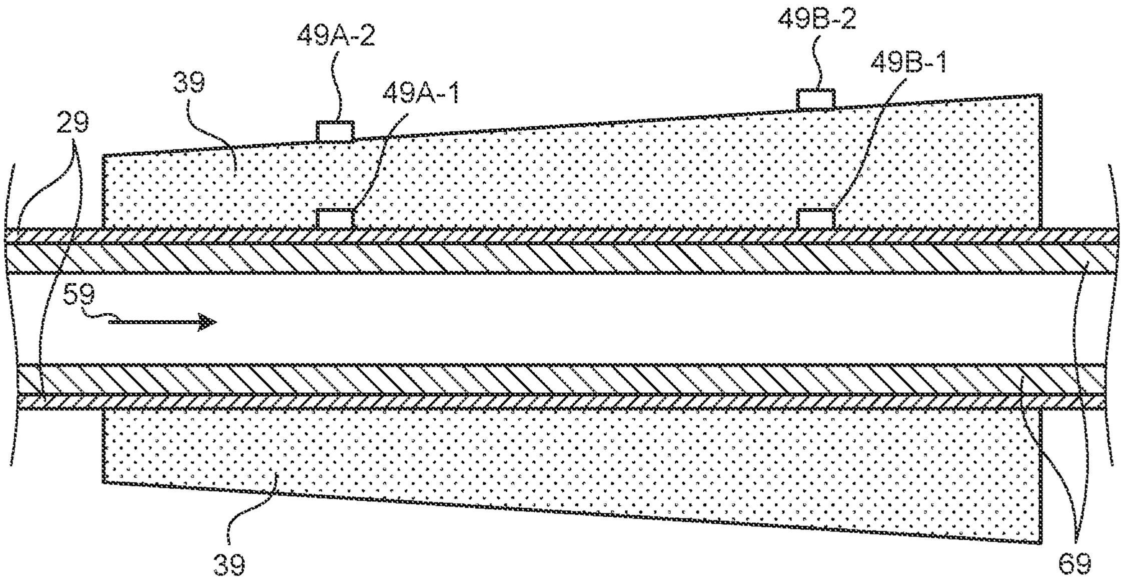
FIG. 16 is a cross-sectional view of a specific example 9 of a pipe and temperature sensors according to one or more embodiments.

Explained below with reference to FIG. 16 is an example in which the estimation operation is performed in a pipe having the temperature sensors arranged to measure the temperature of four points, and in which two pairs of temperature data are obtained from a heat insulation agent having an uneven thickness. FIG. 16 is a cross-sectional view of the specific example 9 of a pipe and temperature sensors according to one or more embodiments. In FIG. 16 is illustrated the cross-sectional surface in the pipe axis direction of a pipe 29 which is covered by a heat insulation agent 39 having an uneven thickness, and in which a deposit 69 gets evenly formed because of the flow of a fluid 59. Moreover, temperature sensors 49A (49A-1 and 49A-2) and temperature sensors 49B (49B-1 and 49B-2) are placed at such positions of the heat insulation agent 39 in the pipe axis direction at which the heat insulation agent 39 has different thicknesses. The temperature sensors 49A-1 and 49A-2 are installed in the same radial direction of the pipe 29, and the temperature sensors 49B-1 and 49B-2 are installed at such positions in the same radial direction of the pipe 29 which are different from the positions of the temperature sensors 49A.

Thus, even if there is only a single heat insulation agent as illustrated in FIG. 16, the estimation device 10 can estimate the deposit thickness by measuring the pipe surface temperature and the heat-insulation-agent surface temperature for each heat insulation agent having a different thickness, a different shape, and a different thermal resistance. That is, as the first-type temperature data at the first-type position, the estimation device 10 obtains the temperature $T_1$ measured by the temperature sensor 49A-1 as the pipe surface temperature of the position at which the heat insulation agent 39 has a smaller thickness, and obtains the temperature $T_3$ measured by the temperature sensor 49A-2 as the heat-insulation-agent surface temperature of the position at which the heat insulation agent 39 has a smaller thickness. Moreover, as the second-type temperature data at the second-type position, the estimation device 10 obtains the temperature $T_2$ measured by the temperature sensor 49B-1 as the pipe surface temperature of the position at which the heat insulation agent 39 has a greater thickness, and obtains the temperature $T_4$ measured by the temperature sensor 49B-2 as the heat-insulation-agent surface temperature of the position at which the heat insulation agent 39 has a greater thickness. Then, in an identical manner to the specific example 1 explained earlier, the estimation device 10 estimates the thickness δ of the deposit 69 and estimates the temperature $T_{inner}$ of the fluid 59.

10. Specific Example 10

Figure 17:
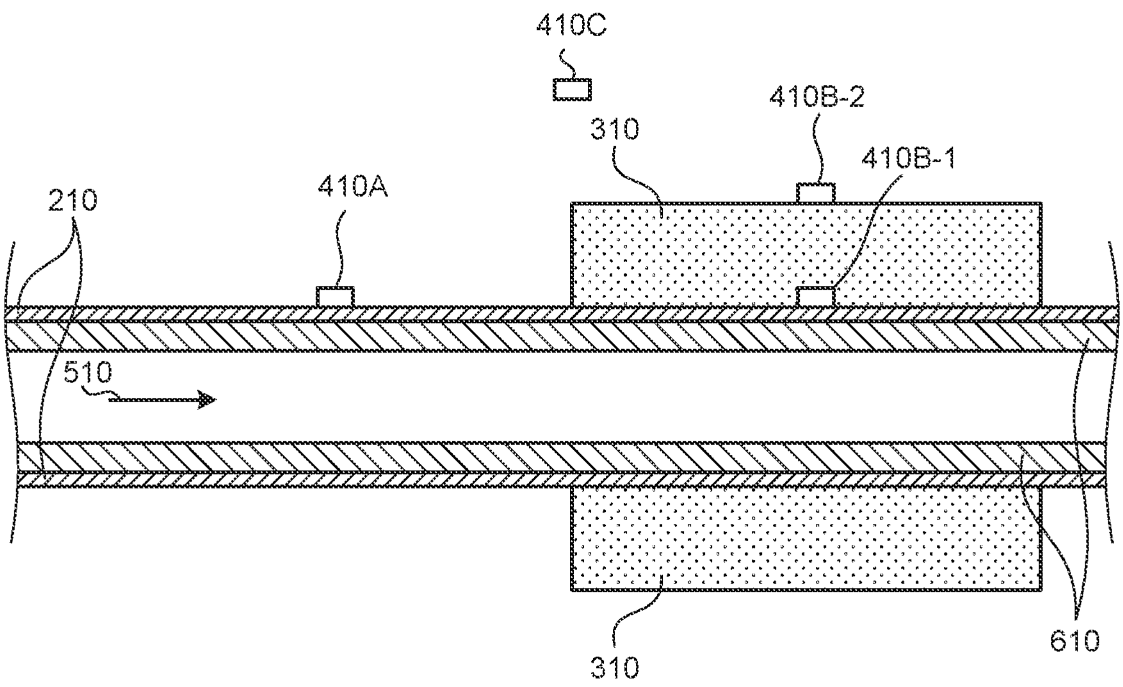
FIG. 17 is a cross-sectional view of a specific example 10 of a pipe and temperature sensors according to one or more embodiments.

Explained below with reference to FIG. 17 is an example in which the estimation operation is performed in a pipe having the temperature sensors arranged to measure the temperature of four points, and in which two pairs of temperature data are obtained from the positions not covered by any heat insulation agent. FIG. 17 is a cross-sectional view of the specific example 10 of a pipe and temperature sensors according to one or more embodiments. In FIG. 17 is illustrated the cross-sectional surface in the pipe axis direction of a pipe 210 which is partially covered by a heat insulation agent 310 and in which a deposit 610 gets evenly formed because of the flow of a fluid 510. A temperature sensor 410A is installed on the pipe 210 not covered by the heat insulation agent 310; temperature sensors 410B (410B-1 and 410B-2) are installed on the heat insulation agent 310; and a temperature sensor 410C is installed outside the pipe 210 in a contactless manner with respect to the pipe 210 and the heat insulation agent 310. The temperature sensors 410B-1 and 410B-2 are installed in the same radial direction of the pipe 210. In the following explanation, the deposit thickness estimation method according to one or more embodiments as implemented in the specific example 10 is explained with reference to mathematical expressions, and that is followed by the detailed explanation of the deposit thickness estimation operation according to one or more embodiments as implemented in the specific example 10.

Deposit Thickness Estimation Method

Given below is the explanation of a method for estimating the deposit thickness according to one or more embodiments as implemented in the specific example 10. When $T_5$ represents the pipe surface temperature obtained by the first obtaining unit 15*a* of the estimation device 10 from a position at which the heat insulation agent 310 is not present, when $T_2$ represents the pipe surface temperature obtained by the second obtaining unit 15*b*, when $T_4$ represents the heat-insulation-agent surface temperature of the heat insulation agent 310, and when $T_6$ represents the air temperature around the pipe 210; the heat movement amount $Q_1$ from the fluid 510 toward the outside of the pipe 210 at the position at which the heat insulation agent 310 is not present is expressed as given below in Equation (12) by taking into account the movement of heat from the in-pipe fluid 510 to the pipe surface and the movement of heat from the pipe surface to the outside atmosphere of the pipe 210.

$$Q_1 = \frac{T_{inner} - T_5}{R_{deposit} + R_{pipe} + R_{innht}} = \frac{T_5 - T_6}{R_{outht1}} \tag{12}$$

Herein, $T_{inner}$ represents the in-pipe fluid temperature of the fluid 510; $R_{deposit}$ represents the thermal resistance of the deposit 610; $R_{pipe}$ represents the thermal resistance of the pipe 210; $R_{innht}$ represents the thermal resistance attributed to the heat transfer of the fluid 510 inside the pipe 210; and $R_{outht1}$ represents the thermal resistance attributed to the heat transfer from the pipe surface toward the outside atmosphere of the pipe 210.

On the other hand, the heat movement amount $Q_2$ from the in-pipe fluid 510 toward the outside of the pipe 210 at the position of the heat insulation agent 310 is expressed as given below in Equation (13) by taking into account the movement of heat from the in-pipe fluid 510 to the pipe surface and the movement of heat from the surface of the heat insulation agent 310 toward the outside atmosphere of the pipe 210.

$$Q_2 = \frac{T_{inner} - T_2}{R_{deposit} + R_{pipe} + R_{innht}} = \frac{T_2 - T_4}{R_2} = \frac{T_4 - T_6}{R_{outht2}} \tag{13}$$

Herein, $R_2$ represents the thermal resistance of the heat insulation agent 310, and $R_{outht2}$ represents the thermal resistance attributed to the heat transfer from the surface of the heat insulation agent 310 toward the outside atmosphere of the pipe 210.

The thermal resistance $R_{outht1}$ can be calculated as given below in Equation (14) using the outer radius $r_{po}$ of the pipe 210 and the heat transfer coefficient $h_{outer1}$ of the surface of the pipe 210.

$$R_{outht1} = \frac{1}{2\pi r_{po} h_{outer1} L} \tag{14}$$

The thermal resistance $R_{outht2}$ can be calculated as given below in Equation (15) using the outer radius $r_{i2}$ of the heat insulation agent 310 and the heat transfer coefficient $h_{outer2}$ of the surface of the heat insulation agent 310.

$$R_{outht2} = \frac{1}{2\pi r_{i2} h_{outer2} L} \tag{15}$$

Moreover, from Equation (15) given above and the measured temperature, the thermal resistance $R_{outht2}$ can be obtained as given below in Equation (16).

$$R_{outht2} = R_2 \cdot \frac{T_4 - T_6}{T_2 - T_4} \tag{16}$$

According to Equation (15) and Equation (16) given above, the heat transfer coefficient $h_{outer2}$ of the surface of the heat insulation agent 310 can be obtained from the measured temperature. Moreover, if the heat transfer coefficient $h_{outer1}$ of the surface of the pipe 210 is treated to be same as the heat transfer coefficient $h_{outer2}$ of the surface of the heat insulation agent 310, then the thermal resistance $R_{outht1}$ can be obtained from Equation (14) given earlier.

Then, from Equation (12) given earlier, Equation (13) given earlier, and the obtained the thermal resistance $R_{outht1}$; a relationship given below in Equation (17) is obtained for the thermal resistance $R_{deposit}$ of the deposit 610 and a relationship given below in Equation (18) is obtained for the in-pipe fluid temperature $T_{inner}$ of the fluid 510.

$$R_{deposit} = \frac{R_{outht1}R_2(T_2 - T_5)}{R_2(T_5 - T_6) - R_{outht1}(T_2 - T_4)} - R_{innht} - R_{pipe} \tag{17}$$

$$T_{inner} = \frac{R_2(T_5 - T_6)T_2 - R_{outht1}(T_2 - T_4)T_5}{R_2(T_5 - T_6) - R_{outht1}(T_2 - T_4)} \tag{18}$$

As explained above, the thermal resistance $R_{deposit}$ of the deposit 610 can be obtained from Equation (17), and the thickness δ of the deposit 610 can be calculated from Equation (11) using the thermal conductivity $k_{deposit}$ of the deposit 610 as stored in the memory unit 14. Moreover, the in-pipe fluid temperature $T_{inner}$ representing the temperature of the fluid 510 can be calculated from Equation (18) given above.

Estimation Operation

Thus, even if the heat insulation agent is placed only in some part as illustrated in FIG. 17, the estimation device 10 can estimate the deposit thickness by measuring: the pipe surface temperature not involving the heat insulation agent; the air temperature; the pipe surface temperature of the heat insulation agent; and the heat-insulation-agent surface temperature. That is, as the first-type temperature data at the first position, the estimation device 10 obtains the temperature $T_5$ measured by the temperature sensor 410A as the pipe surface temperature not involving the heat insulation agent 310, and obtains the temperature $T_6$ measured by the temperature sensor 410C as the air temperature around the pipe 210. Moreover, as the second-type temperature data at the second position, the estimation device 10 obtains the temperature $T_2$ measured by the temperature sensor 410B-1 as the pipe surface temperature of the heat insulation agent 310, and obtains the temperature $T_4$ measured by the temperature sensor 410B-2 as the heat-insulation-agent surface temperature of the heat insulation agent 310.

Subsequently, using the temperature data of the temperatures $T_2$, $T_4$, $T_5$, and $T_6$, the stored thermal resistance $R_{innht}$ of the fluid 510, the stored thermal resistance $R_{pipe}$ of the pipe 210, the thermal resistance $R_{outht1}$ attributed to the heat transfer from the pipe surface to the outside atmosphere of the pipe 210, and the thermal resistance $R_2$ of the heat insulation agent 310; the estimation device 10 obtains the thermal resistance $R_{deposit}$ of the deposit 610 from Equation (17) given earlier. Then, using the stored thermal conductivity $k_{deposit}$ of the deposit 610, the estimation device 10 estimates the thickness δ of the deposit 610 from Equation (11) given above. Moreover, using the temperature data of the temperatures $T_2$, $T_4$, $T_5$, and $T_6$, the thermal resistance $R_{outht1}$ attributed to the heat transfer from the pipe surface to the outside atmosphere of the pipe 210, and the thermal resistance $R_2$ of the heat insulation agent 310; the estimation device 10 can estimate the temperature $T_{inner}$ of the fluid 510 from Equation (18) given earlier.

11. Specific Example 11

Figure 18:
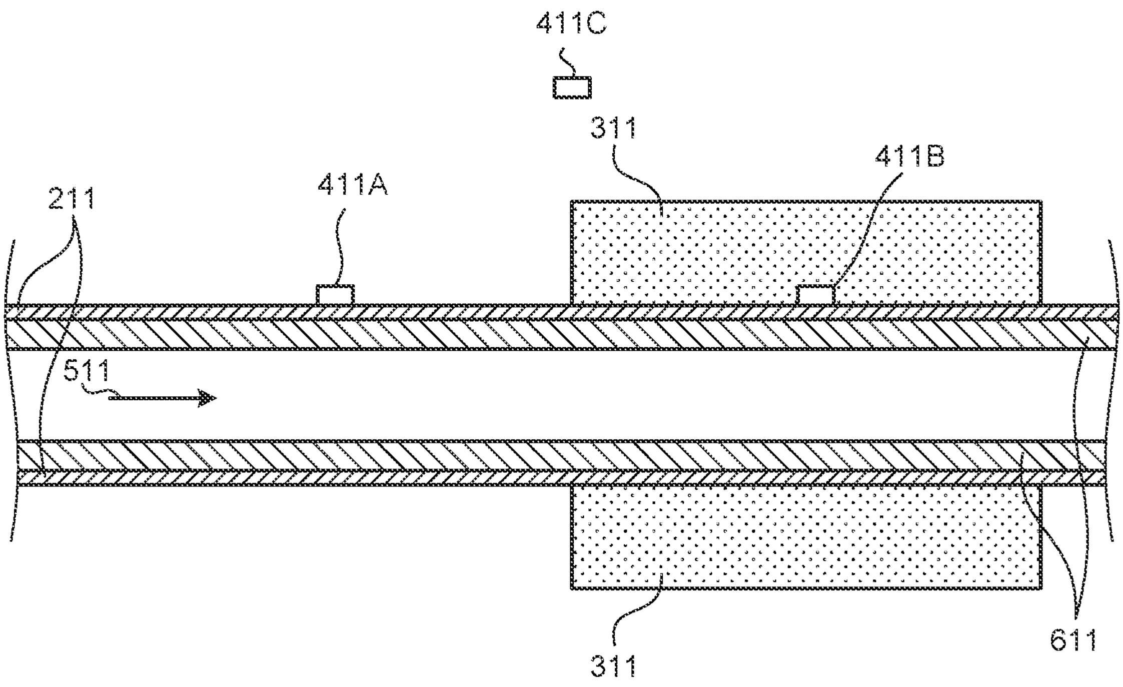
FIG. 18 is a cross-sectional view of a specific example 11 of a pipe and temperature sensors according to one or more embodiments.

Explained below with reference to FIG. 18 is an example in which the estimation operation is performed in a pipe having the temperature sensors arranged to measure the temperature of three points, and in which temperature data of the surrounding of the pipe is obtained. FIG. 18 is a cross-sectional view of the specific example 11 of a pipe and temperature sensors according to one or more embodiments. In FIG. 18 is illustrated the cross-sectional surface in the pipe axis direction of a pipe 211 which is partially covered by a heat insulation agent 311, and in which a deposit 611 gets evenly formed because of the flow of a fluid 511. Moreover, a temperature sensor 411A is installed in that portion of the pipe 211 which is not covered by the heat insulation agent 311; a temperature sensor 411B is installed on the heat insulation agent 311; and a temperature sensor 411C is installed outside the pipe 211 in a contactless manner with respect to the pipe 211 and the heat insulation agent 311. In the following explanation, the deposit thickness estimation method according to one or more embodiments as implemented in the specific example 11 is explained with reference to mathematical expressions, and that is followed by the detailed explanation of the deposit thickness estimation operation according to one or more embodiments as implemented in the specific example 11.

Deposit Thickness Estimation Method

Given below is the explanation of a method for estimating the deposit thickness according to one or more embodiments as implemented in the specific example 11. When $T_5$ represents the pipe surface temperature obtained by the first obtaining unit 15*a* of the estimation device 10 from a position at which the heat insulation agent 311 is not present, when $T_2$ represents the pipe surface temperature obtained by the second obtaining unit 15*b*, and when $T_6$ represents the air temperature around the pipe 211; the heat movement amount $Q_1$ from the fluid 511 toward the outside of the pipe 211 at the position at which the heat insulation agent 311 is not present is expressed as given below in Equation (19) by taking into account the movement of heat from the in-pipe fluid 511 to the pipe surface and the movement of heat from the pipe surface to the outside atmosphere of the pipe 211.

$$Q_1 = \frac{T_{inner} - T_5}{R_{deposit} + R_{pipe} + R_{innht}} = \frac{T_5 - T_6}{R_{outht1}} \tag{19}$$

Herein, $T_{inner}$ represents the in-pipe fluid temperature of the fluid 511; $R_{deposit}$ represents the thermal resistance of the deposit 611; $R_{pipe}$ represents the thermal resistance of the pipe 211; $R_{innht}$ represents the thermal resistance attributed to the heat transfer of the fluid 511 inside the pipe 211; and $R_{outht1}$ represents the thermal resistance attributed to the heat transfer from the pipe surface toward the outside atmosphere of the pipe 211.

On the other hand, the heat movement amount $Q_2$ from the in-pipe fluid 511 toward the outside of the pipe 211 at the position of the heat insulation agent 311 is expressed as given below in Equation (20) by taking into account the movement of heat from the in-pipe fluid 511 to the pipe surface and the movement of heat from the surface of the pipe 211 toward the outside atmosphere of the pipe 211.

$$Q_2 = \frac{T_{inner} - T_2}{R_{deposit} + R_{pipe} + R_{innht}} = \frac{T_2 - T_6}{R_2 + R_{outht2}} \tag{20}$$

Herein, $R_2$ represents the thermal resistance of the heat insulation agent 311, and $R_{outht2}$ represents the thermal resistance attributed to the heat transfer from the surface of the heat insulation agent 311 toward the outside atmosphere of the pipe 211.

At that time, from the strength of the wind on the outside of the pipe 211 and from the type of the fluid on the outside of the pipe (when the atmospheric air is absent, such as in the case of an under-water pipe), the heat transfer coefficient $h_{outer1}$ of the pipe surface and the heat transfer coefficient $h_{outer2}$ of the heat insulation agent surface are predicted. Herein, either the wind strength can be measured using an anemometer and the prediction can be accordingly performed; or, if the environment is such that the wind strength does not fluctuate significantly, the values of heat transfer coefficients can be set in advance. For example, in an almost windless environment, the setting can be done as $h_{outer1}=h_{outer2}=5\ W/m^2K$. Then, according to Equation (14) and Equation (15) given earlier, the thermal resistances $R_{outht1}$ and $R_{outht2}$ can be calculated from the heat transfer coefficients $h_{outer1}$ and $h_{outer2}$, respectively.

Subsequently, using the obtained thermal resistance, the measured temperature, Equation (19) given earlier, and Equation (20) given earlier; a relationship given below in Equation (21) is obtained for the thermal resistance $R_{deposit}$ of the deposit 611 and a relationship given below in Equation (22) is obtained for the in-pipe fluid temperature $T_{inner}$ of the fluid 511.

$$R_{deposit} = \frac{R_{outht1}(R_2 + R_{outht2})(T_2 - T_5)}{(R_2 + R_{outht2})(T_5 - T_6) - R_{outht1}(T_2 - T_6)} - R_{innht} - R_{pipe} \tag{21}$$

$$T_{inner} = \frac{(R_2 + R_{outht2})(T_5 - T_6)T_2 - R_{outht1}(T_2 - T_6)T_5}{(R_2 + R_{outht2})(T_5 - T_6) - R_{outht1}(T_2 - T_6)} \tag{22}$$

As explained above, as a result of using the thermal conductivity $k_{deposit}$ of the deposit 611 as stored in the memory unit 14, based on Equation (21) given above, the thickness of the deposit 611 can be calculated from the thermal resistance $R_{deposit}$ of the deposit 611. Moreover, the in-pipe fluid temperature $T_{inner}$ representing the temperature of the fluid 511 can be calculated from Equation (22) given above.

Estimation Operation

Thus, even if the heat insulation agent is placed only in some part as illustrated in FIG. 18, the estimation device 10 can estimate the deposit thickness by measuring: the pipe surface temperature not involving the heat insulation agent; the air temperature; and the pipe surface temperature of the heat insulation agent. That is, as the first-type temperature data at the first position, the estimation device 10 obtains the temperature $T_5$ measured by the temperature sensor 411A as the pipe surface temperature not involving the heat insulation agent 311, and obtains the temperature $T_6$ measured by the temperature sensor 411C as the air temperature around the pipe 211. Moreover, as the second-type temperature data at the second position, the estimation device 10 obtains the temperature $T_2$ measured by the temperature sensor 411B as the pipe surface temperature of the heat insulation agent 311.

Subsequently, using the temperature data of the temperatures $T_2$, $T_5$, and $T_6$, the stored thermal resistance $R_{innht}$ of the fluid 511, the stored thermal resistance $R_{pipe}$ of the pipe 211, the thermal resistance $R_{outht1}$ attributed to the heat transfer from the pipe surface to the outside atmosphere of the pipe 211, the thermal resistance $R_2$ of the heat insulation agent 311, and the thermal resistance $R_{outht2}$ attributed to the heat transfer from the heat insulation agent surface to the outside atmosphere of the pipe 211; the estimation device 10 obtains the thermal resistance $R_{deposit}$ of the deposit 611 from Equation (21) given earlier. Then, using the stored thermal conductivity $k_{deposit}$ of the deposit 611, the estimation device 10 estimates the thickness δ of the deposit 611. Moreover, using the temperature data of the temperatures $T_2$, $T_5$, and $T_6$, the thermal resistance $R_{outht1}$ attributed to the heat transfer from the pipe surface to the outside atmosphere of the pipe 211, the thermal resistance $R_2$ of the heat insulation agent 311, and the thermal resistance $R_{outht2}$ attributed to the heat transfer from the heat insulation agent surface to the outside atmosphere of the pipe 211; the estimation device 10 can estimate the temperature $T_{inner}$ of the fluid 511 from Equation (22) given earlier.

12. Specific Example 12

Figure 19:
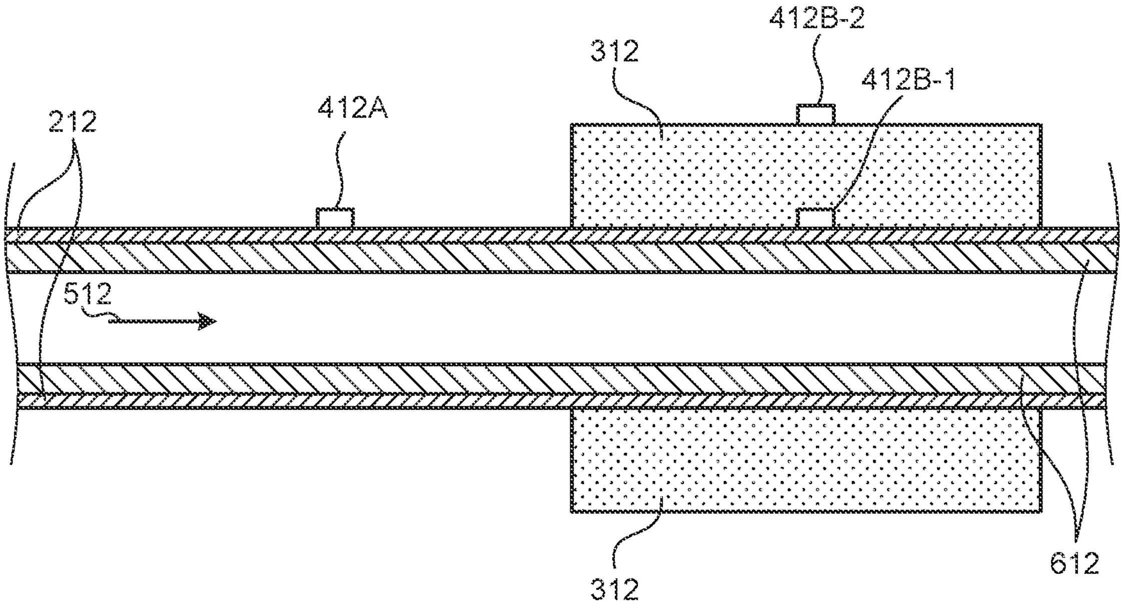
FIG. 19 is a cross-sectional view of a specific example 12 of a pipe and temperature sensors according to one or more embodiments.

Explained below with reference to FIG. 19 is an example in which the estimation operation is performed in a pipe having the temperature sensors arranged to measure the temperature of three points, and in which temperature data of the surrounding of the pipe is not obtained unlike in the specific example 11. FIG. 19 is a cross-sectional view of the specific example 12 of a pipe and temperature sensors according to one or more embodiments. In FIG. 19 is illustrated the cross-sectional surface in the pipe axis direction of a pipe 212 which is partially covered by a heat insulation agent 312, and in which a deposit 612 gets evenly formed because of the flow of a fluid 512. Moreover, a temperature sensor 412A is installed in that portion of the pipe 212 which is not covered by the heat insulation agent 312; and temperature sensors 412B are installed on the heat insulation agent 312.

Thus, even if the heat insulation agent is placed only in some part as illustrated in FIG. 19 and even if the air temperature is not measured or estimated, the estimation device 10 can still estimate the deposit thickness as long as, after measuring the pipe surface temperature not involving the heat insulation agent, measuring the pipe surface temperature of the heat insulation agent, and measuring the heat-insulation-agent surface temperature, the heat transfer coefficient $h_{outer1}$ of the pipe surface and the heat transfer coefficient $h_{outer2}$ of the heat insulation agent surface can be predicted. That is, as the first-type temperature data at the first position, the estimation device 10 obtains the temperature $T_5$ measured by the temperature sensor 412A as the pipe surface temperature not involving the heat insulation agent 312. Moreover, as the second-type temperature data at the second position, the estimation device 10 obtains the temperature $T_2$ measured by a temperature sensor 412B-1 as the pipe surface temperature of the heat insulation agent 312, and obtains the temperature $T_4$ measured by a temperature sensor 412B-2 as the heat-insulation-agent surface temperature of the heat insulation agent 312. Furthermore, the estimation device 10 obtains the predicted values of the heat transfer coefficient $h_{outer1}$ of the pipe surface and the heat transfer coefficient $h_{outer2}$ of the heat insulation agent surface; and accordingly calculates the thermal resistance $R_{outht1}$ attributed to the heat transfer from the pipe surface to the outside atmosphere of the pipe 212, and calculates the thermal resistance $R_{outht2}$ attributed to the heat transfer from the heat insulation agent surface to the outside atmosphere of the pipe 212.

Subsequently, using the temperature data of the temperatures $T_2$, $T_4$, and $T_5$, the stored thermal resistance $R_{innht}$ of the fluid 512, the stored thermal resistance $R_{pipe}$ of the pipe 212, the obtained thermal resistances $R_{outht1}$ and $R_{outht2}$, and the thermal resistance $R_2$ of the heat insulation agent 312; the estimation device 10 solves a system of equations from Equation (12) and Equation (13) given earlier, and obtains the thermal resistance $R_{deposit}$ of the deposit 612 that is an unknown quantity, obtains the air temperature $T_6$ around the pipe 212, and obtains the in-pipe fluid temperature $T_{inner}$ of the fluid 512. Then, using the stored thermal conductivity $k_{deposit}$ of the deposit 612, the estimation device 10 estimates the thickness δ of the deposit 612.

13. Specific Example 13

Figure 20:
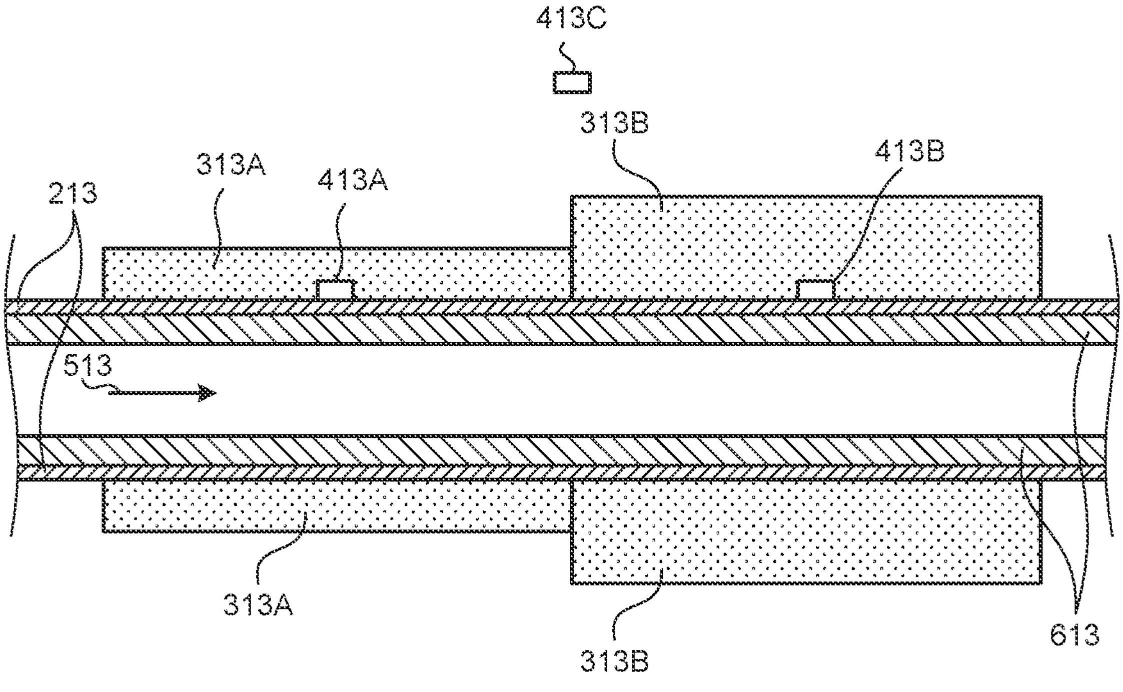
FIG. 20 is a cross-sectional view of a specific example 13 of a pipe and temperature sensors according to one or more embodiments.

Explained below with reference to FIG. 20 is an example in which the estimation operation is performed in a pipe having the temperature sensors arranged to measure the temperature of three points, and in which the temperature data of the surrounding of the pipe is obtained but the heat-insulation-agent surface temperature is not obtained. FIG. 20 is a cross-sectional view of the specific example 13 of a pipe and temperature sensors according to one or more embodiments. In FIG. 20 is illustrated the cross-sectional surface in the pipe axis direction of a pipe 213 which is partially covered by heat insulation agents 313A and 313B having different thicknesses, and in which a deposit 613 gets evenly formed because of the flow of a fluid 513. Moreover, a temperature sensor 413A is installed on the heat insulation agent 313A, and a temperature sensor 413B is installed on the heat insulation agent 313B.

Thus, as illustrated in FIG. 20, even if the heat-insulation-agent surface temperature is not measured or estimated, the estimation device 10 can still estimate the deposit thickness as long as, after measuring the pipe surface temperature of each heat insulation agent having a different thickness and after measuring the air temperature, the heat transfer coefficient $h_{outer1}$ of the heat insulation agent 313A surface and the heat transfer coefficient $h_{outer2}$ of the heat insulation agent 313B surface can be predicted. That is, firstly, as the first-type temperature data at the first position, the estimation device 10 obtains the temperature $T_1$ measured by the temperature sensor 413A as the pipe surface temperature of the heat insulation agent 313A, and obtains the air temperature $T_6$ measured by the temperature sensor 413C as the air temperature around the pipe 213. Moreover, as the second-type temperature data at the second position, the estimation device 10 obtains the temperature data $T_2$ measured by the temperature sensor 413B as the pipe surface temperature of the heat insulation agent 313B. At that time, as the second-type temperature data at the second position, the estimation device 10 can also obtain the temperature data $T_6$ measured by the temperature sensor 413C as the air temperature around the pipe 213. Furthermore, the estimation device 10 obtains the predicted values of the heat transfer coefficient $h_{outer1}$ of the heat insulation agent 313A surface and the heat transfer coefficient $h_{outer2}$ of the heat insulation agent 313B surface; and accordingly calculates the thermal resistance $R_{outht1}$ attributed to the heat transfer from the heat insulation agent 313A surface to the outside atmosphere of the pipe 213, and calculates the thermal resistance $R_{outht2}$ attributed to the heat transfer from the heat insulation agent 313B surface to the outside atmosphere of the pipe 213.

At that time, using the obtained thermal resistance, the measured temperature, Equation (21) given earlier in the specific example 11, and Equation (20) given earlier in the specific example 11; a relationship given below in Equation (23) is obtained for the thermal resistance $R_{deposit}$ of the deposit 613 and a relationship given below in Equation (24) is obtained for the in-pipe fluid temperature $T_{inner}$ of the fluid 513.

$$R_{deposit} = \frac{(R_1 + R_{outht1})(R_2 + R_{outht2})(T_2 - T_1)}{(R_2 + R_{outht2})(T_1 - T_6) - (R_1 + R_{outht1})(T_2 - T_6)} - R_{innht} - R_{pipe} \tag{23}$$

$$T_{inner} = \frac{(R_2 + R_{outht2})(T_1 - T_6)T_2 - (R_1 + R_{outht1})(T_2 - T_6)T_1}{(R_2 + R_{outht2})(T_1 - T_6) - (R_1 + R_{outht1})(T_2 - T_6)} \tag{24}$$

Subsequently, using the temperature data of the temperatures $T_1$, $T_2$, and $T_6$, the stored thermal resistance $R_{innht}$ of the fluid 513, the stored thermal resistance $R_{pipe}$ of the pipe 213, the thermal resistance $R_1$ of the heat insulation agent 313A, the thermal resistance $R_{outht1}$ attributed to the heat transfer from the heat insulation agent 313A surface to the outside atmosphere of the pipe 213, the thermal resistance $R_2$ of the heat insulation agent 313B, and the thermal resistance $R_{outht2}$ attributed to the heat transfer from the heat insulation agent 313B surface to the outside atmosphere of the pipe 213; the estimation device 10 obtains the thermal resistance $R_{deposit}$ of the deposit 613 according to Equation (23) given earlier. Then, using the stored thermal conductivity $k_{deposit}$ of the deposit 613, the estimation device 10 estimates the thickness δ of the deposit 613. Moreover, using the temperature data of the temperatures $T_1$, $T_2$, and $T_6$, the thermal resistance $R_1$ of the heat insulation agent 313A, the thermal resistance $R_{outht1}$ attributed to the heat transfer from the heat insulation agent 313A surface to the outside atmosphere of the pipe 213, the thermal resistance $R_2$ of the heat insulation agent 313B, and the thermal resistance $R_{outht2}$ attributed to the heat transfer from the heat insulation agent 313B surface to the outside atmosphere of the pipe 213; the estimation device 10 can also estimate the temperature $T_{inner}$ of the fluid 513 from Equation (24) given above.

14. Specific Example 14

Figure 21:
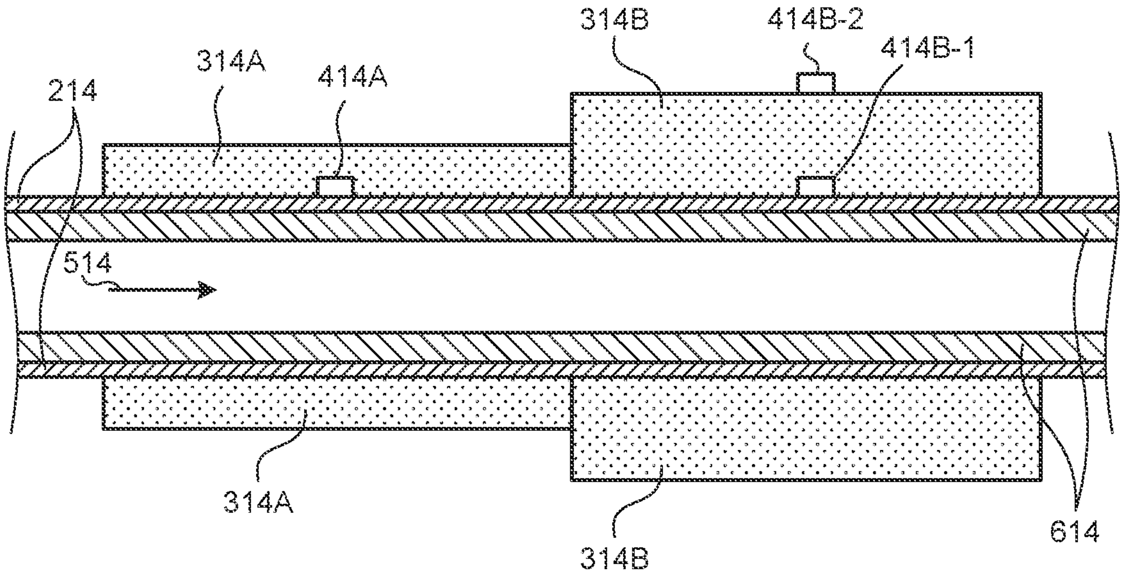
FIG. 21 is a cross-sectional view of a specific example 14 of a pipe and temperature sensors according to one or more embodiments.

Explained below with reference to FIG. 21 is an example in which the estimation operation is performed in a pipe having the temperature sensors arranged to measure the temperature of three points, and in which temperature data of the surrounding of the pipe is not obtained unlike in the specific example 13. FIG. 21 is a cross-sectional view of the specific example 14 of a pipe and temperature sensors according to one or more embodiments. In FIG. 21 is illustrated the cross-sectional surface in the pipe axis direction of a pipe 214 which is covered by heat insulation agents 314A and 314B having different thicknesses, and in which a deposit 614 gets evenly formed because of the flow of a fluid 514. Moreover, a temperature sensor 414A is installed in the heat insulation agent 314A; and temperature sensors 414B (414B-1, 414B-2) are installed in the heat insulation agent 314B.

Thus, as illustrated in FIG. 21, even if the air temperature is not measured or estimated, the estimation device 10 can still estimate the deposit thickness as long as, after measuring the pipe surface temperature for each heat insulation agent having a different thermal resistance and measuring the surface temperature of at least one of the heat insulation agents, the heat transfer coefficient $h_{outer1}$ of the heat insulation agent 314A surface and the heat transfer coefficient $h_{outer2}$ of the heat insulation agent 314B surface can be predicted. That is, as the first-type temperature data at the first position, the estimation device 10 obtains the temperature $T_1$ measured by the temperature sensor 414A as the pipe surface temperature of the heat insulation agent 314A. Moreover, as the second-type temperature data at the first position, the estimation device 10 obtains the temperature $T_2$ measured by the temperature sensor 414B-1 as the pipe surface temperature of the heat insulation agent 314B, and obtains the temperature $T_4$ measured by the temperature sensor 414B-2 as the heat-insulation-agent surface temperature of the heat insulation agent 314B. Furthermore, the estimation device 10 obtains the predicted values of the heat transfer coefficient $h_{outer1}$ of the heat insulation agent 314A surface and the heat transfer coefficient $h_{outer2}$ of the heat insulation agent 314B surface; and accordingly calculates the thermal resistance $R_{outht1}$ attributed to the heat transfer from the heat insulation agent 314A surface to the outside atmosphere of the pipe 214, and calculates the thermal resistance $R_{outht2}$ attributed to the heat transfer from the heat insulation agent surface 314B to the outside atmosphere of the pipe 214.

Subsequently, using the temperature data of the temperatures $T_1$, $T_2$, and $T_4$, the stored thermal resistance $R_{innht}$ of the fluid 514, the stored thermal resistance $R_{pipe}$ of the pipe 214, the obtained thermal resistances $R_{outht1}$ and $R_{outht2}$, the thermal resistance $R_1$ of the heat insulation agents 314A, and the thermal resistance $R_2$ of the heat insulation agents 314B; the estimation device 10 solves a system of equations from Equation (25) and Equation (26) given below, and obtains the thermal resistance $R_{deposit}$ of the deposit 614 that is an unknown quantity, obtains the air temperature $T_6$ around the pipe 214, and obtains the in-pipe fluid temperature $T_{inner}$ of the fluid 514. Then, using the stored thermal conductivity $k_{deposit}$ of the deposit 614, the estimation device 10 estimates the thickness δ of the deposit 614.

$$Q_1 = \frac{T_{inner} - T_1}{R_{deposit} + R_{pipe} + R_{innht}} = \frac{T_1 - T_6}{R_1 + R_{outht1}} \tag{25}$$

$$Q_2 = \frac{T_{inner} - T_2}{R_{deposit} + R_{pipe} + R_{innht}} = \frac{T_2 - T_4}{R_2} = \frac{T_4 - T_6}{R_{outht2}} \tag{26}$$

Moreover, the heat movement amount $Q_1$ from the fluid 514 toward the outside of the pipe 214 at the position of the heat insulation agent 314A is expressed as given below in Equation (27) by taking into account the movement of heat from the in-pipe fluid 514 to the pipe surface, the movement of heat from the pipe surface to the heat insulation agent surface, and the movement of heat from the heat insulation agent surface to the outside atmosphere of the pipe 214.

$$Q_1 = \frac{T_{inner} - T_1}{R_{deposit} + R_{pipe} + R_{innht}} = \frac{T_1 - T_3}{R_1} = \frac{T_3 - T_6}{R_{outht1}} \tag{27}$$

As a result of using Equation (27) given above, the unmeasured heat-insulation-agent surface temperature $T_3$ of the heat insulation agent 314A can also be obtained.

15. Other Specific Examples

Given below is the explanation of specific examples other than the specific examples 1 to 14 explained above. The following explanation is given in the order of a deposit thickness estimation device based on heat flux measurement; an in-pipe fluid velocity estimation operation; and a deposit thickness estimation operation performed when the heat insulation agents are positioned at a distance from each other.

Deposit Thickness Estimation Device Based on Heat Flux Measurement

Firstly, in a configuration in which two types of heat insulation agents having different thermal resistances are used, a heat flux meter is installed in each heat insulation agent, and the estimation device 10 measures the heat flux and the temperature of each heat insulation agent. Then, using the heat flux meter, the estimation device 10 can directly measure the heat movement amount $Q_1$ given earlier in Equation (1) and the heat movement amount $Q_2$ given earlier in Equation (2). Hence, the estimation device 10 solves a system of equations of Equation (1) and Equation (2), and obtains the thermal resistance $R_{deposit}$ of the deposit that is an unknown quantity and obtains the in-pipe fluid temperature $T_{inner}$. Subsequently, using the stored thermal conductivity $k_{deposit}$ of the deposit, the estimation device 10 estimates the thickness δ of the deposit.

Meanwhile, in a configuration in which the heat insulation agents are of a single type, the estimation device 10 installs a heat flux meter on the pipe surface not involving the heat insulation agents and installs a heat flux meter on the inside of the heat insulation agents. Hence, even when the pipe surface temperature not involving the heat insulation agents is used along with the heat flux or even when the pipe surface temperature on the inside of the heat insulation agents is used along with the heat flux, the estimation device 10 can estimate the deposit thickness in an identical sequence.

In-Pipe Fluid Velocity Estimation Operation

A sensor that estimates the internal fluid temperature from the measured temperature of the outside of the pipe is used in a plant. However, in such a measurement method, in order to estimate the internal fluid temperature, the impact of heat transfer between the fluid and the pipe needs to be estimated. In a fluid having low viscosity such as water, the impact of heat transfer is small. However, in a fluid having high viscosity such as oil, the impact of heat transfer increases. If the viscosity and the fluid velocity of the fluid is known, then it becomes possible to estimate the impact of heat transfer. However, if the fluid velocity of the fluid changes, then the impact of heat transfer also changes.

Thus, if the temperature on the inside and on the outside of each heat insulation agent having a different thickness is measured; then, using Equation (6) given earlier, even if the impact of heat transfer is not known, the estimation device 10 can estimate the fluid temperature by taking into account the impact of heat transfer. Meanwhile, if there is no deposit formation, then Equation (28) given below holds true as compared to Equation (5) given earlier.

$$R_{innht} = \frac{R_1 R_2 (T_2 - T_1)}{R_2 (T_1 - T_3) - R_1 (T_2 - T_4)} \tag{28}$$

As a result of using Equation (28) given above, the estimation device 10 can estimate the thermal resistance $R_{innht}$ attributed to the heat transfer of the fluid, and can accordingly estimate and output the in-pipe fluid velocity.

Deposit thickness estimation operation performed when heat insulation agents are positioned at a distance from each other Even if two types of heat insulation agents having different thermal resistances are installed at a distance from each other, as long as there is no significant difference in the in-pipe fluid temperature and the deposit thickness at their installation positions, the estimation device 10 can estimate the deposit thickness δ and the in-pipe fluid temperature $T_{inner}$ in an identical manner to the specific example 1 explained earlier. Moreover, as long as there is no significant difference in the in-pipe fluid temperature and the deposit thickness at their installation positions, the estimation device 10 can estimate the deposit thickness δ and the in-pipe fluid temperature $T_{inner}$ across different pipes too.

Effects of Embodiments

Firstly, in the operations performed according to one or more embodiments, the first-type temperature data is obtained at the position corresponding to the outside of the first-type position of the pipe 20 through which the fluid 50 flows; the second-type temperature data is obtained at the position corresponding to the outside of the second-type position of the pipe 20 at which the conditions related to heat transfer are different than the conditions at the first-type position; the thermal resistance of the deposit 60, which is formed on the inner surface of the pipe 20, is calculated based on the first-type temperature data and the second-type temperature data; and the thickness of the deposit 60 is estimated. Hence, in the present operations, the deposit thickness inside the pipe 20 can be estimated with accuracy.

Secondly, in the operations performed according to one or more embodiments, as the first-type temperature data, the temperature data is obtained at the position corresponding to the outside of the first-type position of the pipe 20 at which the deposit 60 is formed on the inner surface of the pipe 20; and, as the second-type temperature data, the temperature data is obtained at the position corresponding to the outside of the second-type position of the pipe 20 at which the deposit 60 is formed. Then, the temperature difference data is calculated using the first-type temperature data and the second-type temperature data; and the thermal resistance of the deposit 60 is calculated based on the temperature difference data. Moreover, the thickness of the deposit 60 is estimated. Furthermore, based on the temperature difference data, the temperature of the fluid 50 flowing in the pipe 20 is estimated. Hence, in the present operations, as a result of using the temperature difference data among a plurality of points, the deposit thickness inside the pipe 20 can be estimated with accuracy.

Thirdly, in the operations performed according to one or more embodiments, as the first-type temperature data, one or more sets of temperature data are obtained at the position corresponding to the outside of the first-type position of the pipe 20 at which the pipe 20 is covered by a cladding. Moreover, as the second-type temperature data, one or more sets of temperature data are obtained at the position corresponding to the outside of second-type position of the pipe 20 at which the thermal resistance of the cladding is different than the thermal resistance at the first-type position. Then, using the calculated temperature difference data, the thermal resistance of the fluid 50, the thermal resistance of the pipe 20, and the thermal resistance of the cladding; the thermal resistance of the deposit 60 is calculated and then the thickness of the deposit 60 is estimated. Hence, in the present operations, as a result of using the temperature difference data among a plurality of points of the heat insulation agents having different thermal resistances, the deposit thickness inside the pipe 20 can be estimated with accuracy.

Fourthly, in the operations performed according to one or more embodiments, as the first-type temperature data, the first-type pipe surface temperature representing the temperature of the outer surface of the pipe 20 at the first-type position is obtained, and the first-type cladding surface temperature representing the temperature of the cladding surface in a radial direction of the first-type position is obtained. Moreover, as the second-type temperature data, the second-type pipe surface temperature representing the temperature of the outer surface of the pipe 20 at the second-type position is obtained, and the second-type cladding surface temperature representing the temperature of the cladding surface in a radial direction of the second-type position is obtained. Then, using the temperature difference between the first-type pipe surface temperature and the first-type cladding surface temperature, using the temperature difference between the second-type pipe surface temperature and the second-type cladding surface temperature, using the temperature difference between the first-type pipe surface temperature and the second-type pipe surface temperature, using the thermal resistance of the fluid 50, using the thermal resistance of the pipe 20, and using the thermal resistance of the cladding; the thermal resistance of the deposit 60 is calculated and then the thickness of the deposit 60 is estimated. Hence, in the present operations, as a result of using the temperature difference data in the heat transfer direction, the deposit thickness inside the pipe 20 can be estimated with accuracy.

Fifthly, in the operations performed according to one or more embodiments, as the first-type temperature data, the temperature data is obtained on the inside of a plurality of claddings in the radial direction of the first-type position. Moreover, as the second-type temperature data, the temperature data is obtained on the inside of a plurality of claddings in the radial direction of the second-type position. Hence, in the present operations, it becomes possible to install a temperature sensor in advance in a heat insulation agent, and the deposit thickness inside the pipe 20 can be estimated in an accurate and efficient manner.

Sixthly, in the operations performed according to one or more embodiments, as the first-type temperature data, one or more sets of temperature data are obtained at the position corresponding to the outside of the first-type position of the pipe 20 at which the pipe 20 is not covered by a cladding. Moreover, as the second-type temperature data, one or more sets of temperature data are obtained at the position corresponding to the outside of the second-type position of the pipe 20 at which the pipe 20 is covered by a cladding. Then, using the calculated temperature difference data, the thermal resistance of the fluid 50, the thermal resistance of the pipe 20, and the thermal resistance of the cladding; the thermal resistance of the deposit 60 is calculated and then the thickness of the deposit 60 is estimated. Hence, in the present operations, also in the pipe 20 in which a heat insulation agent is placed only in some part, the deposit thickness inside the pipe 20 can be estimated with accuracy.

Seventhly, in the operations performed according to one or more embodiments, using the air temperature on the outside of the pipe, or using the fluid temperature, or using the heat transfer coefficient of the surface of the cladding; the thermal resistance of the deposit 60 is calculated and then the thickness of the deposit 60 is estimated. Hence, in the present operations, also in the pipe 20 in which a heat insulation agent is placed only in some part, the deposit thickness inside the pipe 20 can be estimated in an accurate and efficient manner.

Eighthly, in the operations performed according to one or more embodiments, the first-type heat flux data is further obtained for use in calculating the amount of heat movement from the fluid 50 toward the outside of the pipe 20 at the first-type position. Moreover, the second-type heat flux data is further obtained for use in calculating the amount of heat movement from the fluid 50 toward the outside of the pipe 20 at the second-type position. Then, using the first-type temperature data, the second-type temperature data, the first-type heat flux data, and the second-type heat flux data; the thermal resistance of the deposit 60 is calculated and then the thickness of the deposit 60 is estimated. Hence, in the present operations, as a result of directly obtaining the amount of heat movement, the deposit thickness inside the pipe 20 can be estimated with accuracy.

Ninthly, in the operations performed according to one or more embodiments, in the pipe 20 meant for transmitting oil or a gas generated in a well, the first-type temperature data and the second-type temperature data is obtained. Then, based on the first-type temperature data and the second-type temperature data, the thickness of hydrate, wax, asphaltene, or scale is estimated. Hence, in the present operations, in an oil pipeline or a gas pipeline, the deposit thickness inside the pipe 20 can be estimated with accuracy.

System

The processing procedures, the control procedures, specific names, various data, and information including parameters described in embodiments or illustrated in the drawings can be changed as required unless otherwise specified.

The constituent elements of the device illustrated in the drawings are merely conceptual, and need not be physically configured as illustrated. The constituent elements, as a whole or in part, can be separated or integrated either functionally or physically based on various types of loads or use conditions.

The process functions implemented in the device are entirely or partially implemented by a CPU or by computer programs (instructions) that are analyzed and executed by a CPU, or are implemented as hardware by wired logic.

Hardware

Figure 22:
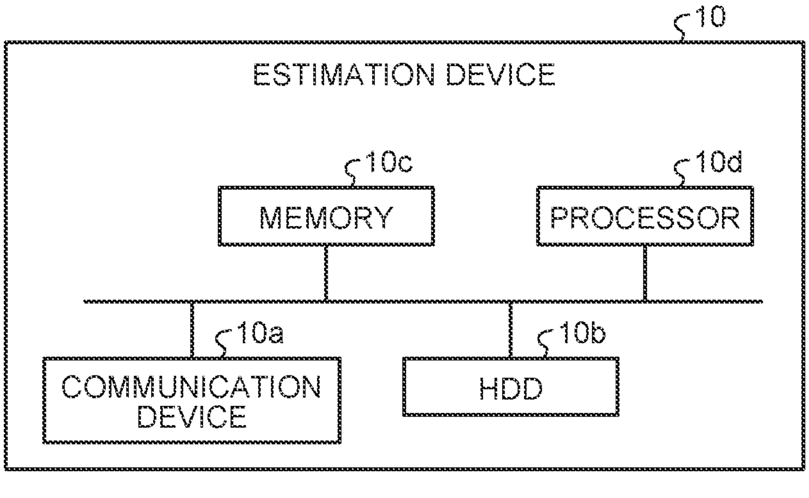
FIG. 22 is a diagram for explaining an exemplary hardware configuration according to one or more embodiments.

Given below is the explanation of an exemplary hardware configuration example of the estimation device 10. Herein, the other devices too can have an identical hardware configuration. FIG. 22 is a diagram illustrating an exemplary hardware configuration. As illustrated in FIG. 22, the estimation device 10 includes a communication device 10*a*, a hard disk drive (HDD) 10*b*, a memory 10*c*, and a processor 10*d*. The constituent elements illustrated in FIG. 22 are connected to each other by a bus.

The communication device 10*a* is a network interface card, and communicates with other servers. The HDD 10*b* is used to store a computer program meant for implementing the functions illustrated in FIG. 2, and to store a database (DB).

The processor 10*d* reads the computer program, which is meant for executing identical operations to the operations performed by the processing units illustrated in FIG. 2, from the HDD 10*b* and loads it in the memory 10*c*. As a result, the processor 10*d* implements a process for executing the functions explained with reference to FIG. 2. For example, the process executes functions identical to the functions of the processing units illustrated in FIG. 2. More particularly, the processor 10*d* reads, from the HDD 10*b*, a computer program having functions identical to the first obtaining unit 15*a*, the second obtaining unit 15*b*, and the estimating unit 15*c*. Then, the processor 10*d* executes a process that executes identical operations to the operations performed by the first obtaining unit 15*a*, the second obtaining unit 15*b*, and the estimating unit 15*c*.

In this way, the estimation device 10 reads and executes a computer program, and operates as an information processing device that implements various processing methods. Alternatively, the estimation device 10 can read the computer program from a recording medium using a medium reading device, and can execute the read computer program to implement functions identical to the functions according to one or more embodiments described above. Meanwhile, the computer program is not limited to be executed in the estimation device 10. Alternatively, for example, even when the computer program is executed by some other computer or some other server or when the computer program is executed in cooperation among devices, the present invention can still be implemented in an identical manner.

The computer program can be distributed via a network such as the Internet. Alternatively, the computer program can be recorded in a computer-readable recording medium such as a hard disk, a flexible disk (FD), a compact disc read only memory (CD-ROM), a magneto-optical (MO) disk, or a digital versatile disc (DVD). Then, a computer can read the computer program from the recording medium, and execute it.

One or more embodiments can estimate a deposit thickness inside a pipe with accuracy.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An estimation device for estimating a thickness of a deposit formed on an inner surface of a pipe and for optimally implementing a method of removing the deposit based on the estimated thickness, comprising:

a network interface card configured to receive:

first-type temperature data, from at least one temperature sensor installed at a first position, on an outside of the pipe in which a fluid flows, wherein a first cladding covers the pipe at the first position, the first-type temperature data includes:

first-type pipe surface temperature representing temperature of an outer surface of the pipe at the first position; and first-type cladding surface temperature representing temperature of a cladding surface that is on the outside of the pipe in a radial direction from the first position, and second-type temperature data, from at least one temperature sensor installed at a second position, on the outside of the pipe, wherein a second cladding covers the pipe at the second position, the second-type temperature data includes:

second-type pipe surface temperature representing temperature of the outer surface at the second position; and second-type cladding surface temperature representing temperature of the cladding surface that is on the outside of the pipe in the radial direction from the second position, and a first thermal resistance of the first cladding is different from a second thermal resistance of the second cladding; and a controller configured to:

calculate thermal resistance of the deposit based on temperature difference between the first-type pipe surface temperature and the first-type cladding surface temperature, temperature difference between the second-type pipe surface temperature and the second-type cladding surface temperature, the first thermal resistance, and the second thermal resistance, estimate the thickness of the deposit based on the thermal resistance, and cause a display to display the estimated thickness used to implement the method of removing the deposit.

2. The estimation device according to claim 1, wherein the network interface card is configured to receive:

the first-type temperature data on the outside of the first position at which the deposit is formed on the inner surface, and the second-type temperature data on the outside of the second position at which the deposit is formed, and the controller is configured to:

calculate temperature difference data based on the first-type temperature data and the second-type temperature data, calculate the thermal resistance of the deposit based on the temperature difference data, and estimate, based on the temperature difference data, temperature of the fluid flowing in the pipe.

3. The estimation device according to claim 2, wherein the controller is configured to calculate the thermal resistance of the deposit based on the temperature difference data, thermal resistance of the fluid, thermal resistance of the pipe, the first thermal resistance, and the second thermal resistance.

4. The estimation device according to claim 3, wherein the controller is configured to calculate the thermal resistance of the deposit based on the temperature difference between the first-type pipe surface temperature and the first-type cladding surface temperature, the temperature difference between the second-type pipe surface temperature and the second-type cladding surface temperature, temperature difference between the first-type pipe surface temperature and the second-type pipe surface temperature, the thermal resistance of the fluid, the thermal resistance of the pipe, the first thermal resistance, and the second thermal resistance.

5. The estimation device according to claim 3, wherein the network interface card is configured to receive:

as the first-type temperature data, two sets of first-type temperature data of inside of the first cladding that is on the outside of the pipe in the radial direction from the first position, and as the second-type temperature data, two sets of second-type temperature data of the inside of the second cladding that is on the outside of the pipe in the radial direction from the second position, and the controller is configured to calculate the thermal resistance of the deposit based on temperature difference between the two sets of first-type temperature data, temperature difference between the two sets of second-type temperature data, temperature difference between one selected from the two sets of first-type temperature data and one selected from the two sets of second-type temperature data based on obtained position, the thermal resistance of the fluid, the thermal resistance of the pipe, the first thermal resistance, and the second thermal resistance.

6. The estimation device according to claim 2, wherein the network interface card is configured to receive:

as the first-type temperature data, two or more sets of temperature data on the outside of the first position at which the first cladding does not cover the pipe, and as the second-type temperature data, two or more sets of temperature data on the outside of the second position at which the second cladding covers the pipe, and the controller is configured to calculate the thermal resistance of the deposit based on the temperature difference data, thermal resistance of the fluid, thermal resistance of the pipe, and the first thermal resistance, and the second thermal resistance.

7. The estimation device according to claim 3, wherein the controller is configured to calculate the thermal resistance of the deposit based on air temperature or fluid temperature on the outside of the pipe, or based on heat transfer coefficient of a surface of the first cladding and heat transfer coefficient of a surface of the second cladding.

8. The estimation device according to claim 6, wherein the controller is configured to calculate the thermal resistance of the deposit based on air temperature or fluid temperature on the outside of the pipe, or based on heat transfer coefficient of a surface of the first cladding and heat transfer coefficient of a surface of the second cladding.

9. The estimation device according to claim 1, wherein the network interface card is configured to further receive:

first-type heat flux data used in calculating amount of heat movement from the fluid toward the outside of the pipe at the first position, and second-type heat flux data used in calculating amount of heat movement from the fluid toward the outside of the pipe at the second position, and the controller is configured to calculate the thermal resistance of the deposit based on the first-type temperature data, the second-type temperature data, the first-type heat flux data, and the second-type heat flux data.

10. The estimation device according to claim 1, wherein the network interface card is configured to receive the first-type temperature data in the pipe that transmits oil or a gas generated from a well, and the second-type temperature data in the pipe, and the controller is configured to estimate thickness of hydrate, wax, asphaltene, or scale based on the first-type temperature data and the second-type temperature data.

11. An estimation method for estimating a thickness of a deposit formed on an inner surface of a pipe and for optimally implementing a method of removing the deposit based on the estimated thickness, comprising:

receiving, with a network interface card first-type temperature data, from at least one temperature sensor installed at a first position, on an outside of the pipe in which a fluid flows, wherein a first cladding covers the pipe at the first position, and the first-type temperature data includes:

first-type pipe surface temperature representing temperature of an outer surface of the pipe at the first position; and first-type cladding surface temperature representing temperature of a cladding surface that is on the outside of the pipe in a radial direction from the first position;

receiving, with the network interface card second-type temperature data, from at least one temperature sensor installed at a second position, on the outside of the pipe, wherein a second cladding covers the pipe at the second position, the second-type temperature data includes:

second-type pipe surface temperature representing temperature of the outer surface at the second position; and second-type cladding surface temperature representing temperature of the cladding surface that is on the outside of the pipe in the radial direction from the second position, and a first thermal resistance of the first cladding is different from a second thermal resistance of the second cladding;

calculating, with a controller, thermal resistance of the deposit based on temperature difference between the first-type pipe surface temperature and the first-type cladding surface temperature, temperature difference between the second-type pipe surface temperature and the second-type cladding surface temperature, the first thermal resistance, and the second thermal resistance;

estimating, with the controller, the thickness of the deposit based on the thermal resistance; and causing a display to display the estimated thickness used to implement the method of removing the deposit based on the estimated thickness.

12. A non-transitory computer-readable recording medium for estimating a thickness of a deposit formed on an inner surface of a pipe and for optimally implementing a method of removing the deposit based on the estimated thickness, having stored therein estimation instructions that cause a computer to perform a process comprising:

receiving, with a network interface card, at least one set of first-type temperature data, from at least one temperature sensor installed at a first position, on an outside of the pipe in which a fluid flows, wherein a first cladding covers the pipe at the first position, and the first-type temperature data includes:

first-type pipe surface temperature representing temperature of an outer surface of the pipe at the first position; and first-type cladding surface temperature representing temperature of a cladding surface that is on the outside of the pipe in a radial direction from the first position;

receiving, with the network interface card, at least one set of second-type temperature data, from at least one temperature sensor installed at a second position, on the outside of the pipe, wherein a second cladding covers the pipe at the second position, the second-type temperature data includes:

second-type pipe surface temperature representing temperature of the outer surface at the second position; and second-type cladding surface temperature representing temperature of the cladding surface that is on the outside of the pipe in the radial direction from the second position, and a first thermal resistance of the first cladding is different from a second thermal resistance of the second cladding;

calculating, with a controller, thermal resistance of the deposit based on temperature difference between the first-type pipe surface temperature and the first-type cladding surface temperature, temperature difference between the second-type pipe surface temperature and the second-type cladding surface temperature, the first thermal resistance, and the second thermal resistance;

estimating, with the controller, the thickness of the deposit based on the thermal resistance; and causing a display to display the estimated thickness used to implement the method of removing the deposit based on the estimated thickness.

* * * * *